US010708774B2

(12) United States Patent
Koo et al.

(10) Patent No.: US 10,708,774 B2
(45) Date of Patent: Jul. 7, 2020

(54) METHOD AND DEVICE FOR TRANSMITTING AND RECEIVING AUTHENTICATION INFORMATION IN WIRELESS COMMUNICATION SYSTEM

(71) Applicant: Samsung Electronics Co., Ltd., Suwon-si, Gyeonggi-do (KR)

(72) Inventors: Bon-Hyun Koo, Suwon-si (KR); Su-Byeong Oh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 15/119,951

(22) PCT Filed: Feb. 16, 2015

(86) PCT No.: PCT/KR2015/001555
§ 371 (c)(1),
(2) Date: Aug. 18, 2016

(87) PCT Pub. No.: WO2015/126124
PCT Pub. Date: Aug. 27, 2015

(65) Prior Publication Data
US 2017/0127276 A1 May 4, 2017

(30) Foreign Application Priority Data
Feb. 18, 2014 (KR) .................. 10-2014-0018548

(51) Int. Cl.
H04L 29/06 (2006.01)
H04W 12/06 (2009.01)
(Continued)

(52) U.S. Cl.
CPC .......... H04W 12/06 (2013.01); H04L 9/3226 (2013.01); H04L 63/083 (2013.01);
(Continued)

(58) Field of Classification Search
CPC . H04L 63/08; H04L 63/0853; H04L 63/0807; H04L 63/083; H04L 2209/80; H04W 12/02; H04W 12/06
See application file for complete search history.

(56) References Cited

U.S. PATENT DOCUMENTS 7,752,329 B1 * 7/2010 Meenan ................. H04L 12/66
709/217
2006/0177066 A1 * 8/2006 Han ...................... H04L 63/061
380/277
(Continued)

FOREIGN PATENT DOCUMENTS

KR 10-2014-0089461 A 7/2014
KR 10-2014-0126641 A 10/2014
(Continued)

OTHER PUBLICATIONS

Shintaro Mizuno et al., Authentication Using Multiple Communication Channels, Nov. 2005, ACM, pp. 54-62. (Year: 2005).*
(Continued)

Primary Examiner — Luu T Pham
Assistant Examiner — Fahimeh Mohammadi
(74) Attorney, Agent, or Firm — Jefferson IP Law, LLP

(57) ABSTRACT

A method for transmitting authentication information of a service provided from a service providing server at a first device in a wireless communication system comprising a plurality of devices includes obtaining, from an authentication server, first access information using an authentication code obtained based on an IDentifier (ID) and a password of an application for using of the service from the authentication server, transmitting, to the service providing server, a service request message comprising the first access information, performing a connection procedure with a second device among the plurality of devices, obtaining from the connected second device, second device information, and
(Continued)

after registering the second device to the service providing server based on the second device information, transmitting, to the second device, registration information comprising the authentication code. The authentication code is used to request second access information of the second device to the authentication server.

12 Claims, 15 Drawing Sheets

(51) Int. Cl.
*H04L 9/32* (2006.01)
*H04W 12/02* (2009.01)

(52) U.S. Cl.
CPC ...... *H04L 63/0807* (2013.01); *H04L 2209/80* (2013.01); *H04W 12/02* (2013.01)

(56) References Cited

U.S. PATENT DOCUMENTS

| | | |
|---|---|---|
| 2006/0251256 A1 | 11/2006 | Asokan et al. |
| 2007/0002873 A1* | 1/2007 | Maekawa ............ H04L 12/4633 370/398 |
| 2007/0162762 A1 | 7/2007 | Huh et al. |
| 2007/0256118 A1* | 11/2007 | Nomura ............... H04L 12/2803 726/3 |
| 2008/0091688 A1* | 4/2008 | Yun ......................... G06F 16/21 |
| 2008/0098466 A1* | 4/2008 | Yoshida ................... G06F 21/35 726/5 |
| 2011/0321147 A1 | 12/2011 | Chakra et al. |
| 2012/0131343 A1* | 5/2012 | Choi ................... H04L 63/0815 713/168 |
| 2012/0240214 A1* | 9/2012 | Ogura ..................... G06F 21/31 726/12 |
| 2012/0309318 A1 | 12/2012 | Matsuo et al. |
| 2013/0086644 A1* | 4/2013 | Bahn .................... H04L 12/2818 726/4 |
| 2013/0100855 A1* | 4/2013 | Jung ...................... H04W 12/06 370/254 |
| 2013/0198510 A1* | 8/2013 | Rahman .................. H04L 9/321 713/155 |
| 2014/0026193 A1 | 1/2014 | Saxman et al. |
| 2014/0040993 A1* | 2/2014 | Lorenzo .................. G06F 21/41 726/4 |
| 2014/0173695 A1* | 6/2014 | Valdivia .................. G06F 21/36 726/4 |
| 2014/0195805 A1 | 7/2014 | Koo et al. |
| 2014/0206348 A1* | 7/2014 | Johnsson ............... H04W 8/005 455/434 |
| 2014/0317242 A1 | 10/2014 | Koo et al. |
| 2014/0329497 A1* | 11/2014 | Sanzgiri ................. H04W 12/06 455/411 |
| 2015/0089613 A1* | 3/2015 | Tippett ................ H04L 63/0853 726/7 |
| 2015/0101032 A1 | 4/2015 | Shimakawa |

FOREIGN PATENT DOCUMENTS

| | | |
|---|---|---|
| WO | WO 01/78350 * | 10/2001 |
| WO | 2013/145517 A1 | 10/2013 |

OTHER PUBLICATIONS

Matthias Wählisch et al., Peer the Peers: An Overlay ID Assignment Service at Internet Exchange Points, Dec. 2009, ACM, pp. 45-46. (Year: 2009).*

Xiaojing Ye et al., A Framework for Cloud-based Smart Home, Dec. 24-26, 2011, IEEE, pp. 894-897. (Year: 2011).*

Nektarios Papadopoulos et al., A Connected Home Platform and Development Framework for Smart Home Control Applications, Aug. 7, 2009, IEEE, pp. 402-409. (Year: 2009).*

Chinese Office Action dated Aug. 7, 2018, issued in connection with a counterpart Chinese application No. 201580009359.8.

* cited by examiner

METHOD AND DEVICE FOR TRANSMITTING AND RECEIVING AUTHENTICATION INFORMATION IN WIRELESS COMMUNICATION SYSTEM

CROSS-REFERENCE TO RELATED APPLICATION(S)

This application is a U.S. National Stage application under 35 U.S.C. § 371 of an International application filed on Feb. 16, 2015 and assigned application number PCT/KR2015/001555, which claimed the benefit of a Korean patent application filed on Feb. 18, 2014 in the Korean Intellectual Property Office and assigned Serial number 10-2014-0018548, the entire disclosure of which is hereby incorporated by reference.

TECHNICAL FIELD

The present invention relates to a method and a device for transmitting and receiving authentication information in a wireless communication system.

BACKGROUND ART

An Open Authorization Protocol (OAuth)-based authentication scheme refers to a standard authentication scheme developed by using an open Application Programmer Interface (API). The OAuth-based authentication scheme may be used to authenticate a user in various applications. When the OAuth-based authentication scheme is used, the user has convenience in that the user can use applications, which share a result of the relevant authentication, even without performing separate authentication on the relevant applications.

Meanwhile, in the OAuth-based authentication scheme, an authentication device becomes an object and directly processes a request for authentication and authorization. The request for the authentication and authorization is performed based on an IDentifier (ID) and a password of a user of the relevant application, such as "http://{ipaddress: port)/api/login_request?id=test&pwd=12345."

Accordingly, previously, for authentication for using an application, the authentication device needs to request the user to input an ID and a password, and thus, a problem arises in that a device that does not include an input/output interface cannot perform an authentication process. Also, although the authentication process is performed, the password is stored in a web cookie and the like, and accordingly, a problem arises in that it is easy to expose the password.

DETAILED DESCRIPTION OF THE INVENTION

Technical Problem

The present invention proposes a method and a device for transmitting and receiving authentication information in a wireless communication system.

The present invention proposes a method and a device which enable the execution of an authentication operation even by a device that does not include an input/output interface and cannot directly perform an authentication request or needs to perform an authentication operation through another device and the like.

The present invention proposes a method and a device which can enhance security by periodically updating a token.

Technical Solution

In accordance with an aspect of the present invention, a method for transmitting authentication information of a service provided from a service providing server at a first device in a wireless communication system comprising a plurality of devices, the method comprising: obtaining, from an authentication server, first access information using an authentication code obtained based on an IDentifier (ID) and a password of an application for using of the service from the authentication server; transmitting, to the service providing server, a service request message comprising the first access information; performing a connection procedure with a second device among the plurality of devices, obtaining from the connected second device, second device information; and after registering the second device to the service providing server based on the second device information, transmitting, to the second device, registration information comprising the authentication code, wherein the authentication code is used to request second access information of the second device to the authentication server.

In accordance with another aspect of the present invention, a method for receiving authentication information of a service provided from a service providing server at a second device in a wireless communication system comprising the plurality of devices, the method comprising: performing a connection procedure with a first device; transmitting, to the second device, second device information; if the second device is registered to the service providing server based on the second device information, receiving, from the first device, registration information comprising an authentication code of the first device, first access information, information of an authentication server, and information of the service providing server; and transmitting, to the service providing server, a service request comprising the first access information.

In accordance with still another aspect of the present invention, a first device for transmitting authentication information of a service provided from a service providing server in a wireless communication system comprising a plurality of devices, the first device comprising: a controller configured to obtain, from an authentication server, first access information using an authentication code obtained based on an IDentifier (ID) and a password of an application for using of the service from the authentication server, control a transceiver to transmit, to the service providing server, a service request message comprising the first access information, and perform a connection procedure with a second device among the plurality of devices, obtaining from the connected second device, second device information; and after registering the second device to the service providing server based on the second device information, the tranceiver configured to transmit, to the second device, registration information comprising the authentication code, wherein the authentication code is used to request second access information of the second device to the authentication server.

In accordance with yet another aspect of the present invention, a second device for receiving authentication information of a service provided from a service providing server in a wireless communication system comprising a plurality of devices, the second device comprising: a controller configured to perform a connection procedure with a first device, control a transceiver to transmit, to the second device, second device information; and if the second device is registered to the service providing server based on the second device information, the tranceiver configured to receive, from the first device, registration information comprising an authentication code of the first device, first access information, information of an authentication server, and information of the service providing server, and transmit, to the service providing server, a service request comprising the first access information.

Advantageous Effects

The present invention is advantageous in that even a device that does not include an input/output interface can easily configure a network and can perform authentication and the periodic update of a token. Also, the present invention provides convenience with which a registration process can be performed and information for authentication can be received by using a mobile terminal, and is advantageous in that the present invention can be utilized for a personal cloud device and the like and can provide home control and various content consumption functions.

MODE FOR CARRYING OUT THE INVENTION

Hereinafter, the operating principle of the present invention will be described in detail with reference to the accompanying drawings. In describing the present invention below, a detailed description of related known configurations or functions incorporated herein will be omitted when it is determined that the detailed description thereof may unnecessarily obscure the subject matter of the present invention. The terms which will be described below are terms defined in consideration of the functions in the present invention, and may be different according to users, intentions of the users, or customs. Therefore, the definitions of the terms should be made based on the contents throughout the specification.

The present invention provides a method and a device for transmitting and receiving authentication information in a wireless communication system. Before describing an embodiment of the present invention, a typical authentication process for using a service will be described.

Figure 1:
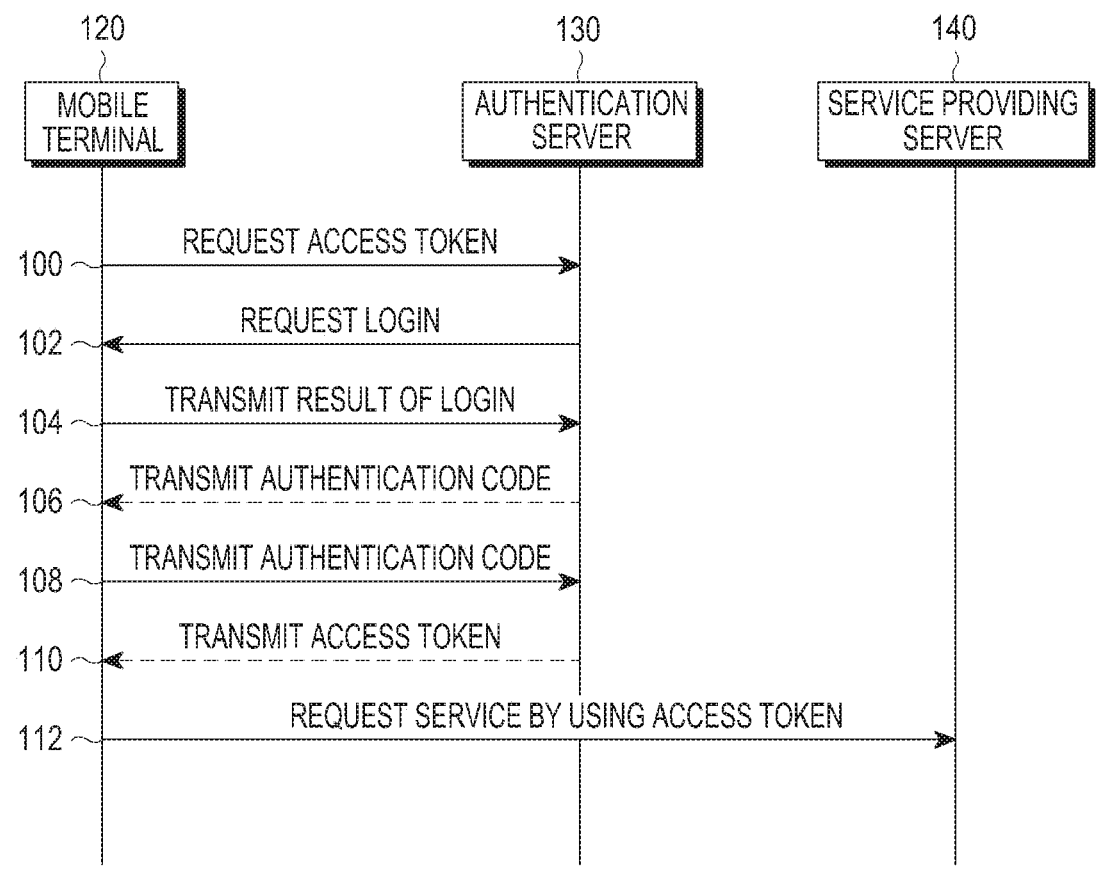
FIG. 1 is a signal flow diagram illustrating a typical authentication process for using a service.

FIG. 1 is a signal flow diagram illustrating a typical authentication process for using a service.

As illustrated in FIG. 1, the typical authentication process for using a service is performed by a mobile terminal 120 including an Application (hereinafter referred to as an "App") used by a user, an authentication server 130 that authenticates whether the user of the App is an appropriate user, and a service providing server 140 that provides a service related to the App.

Referring to FIG. 1, when the App is executed by the user, in step 100, the mobile terminal 120 sends, to the authentication server 130, a request for an access token for using a service according to the App. Then, in step 102, the authentication server 130 requests the mobile terminal 120 to log in to the App, in order to determine whether the request for the access token is a request of a user who is appropriate for using the service.

The mobile terminal 120 receives, as input, login information, such as an ID, a password, and the like, from the user, and logs in to the relevant App. Then, in step 104, the mobile terminal 120 transmits, to the authentication server 130, a result of the login which indicates whether the login has been successfully performed.

In step 106, the authentication server 130 transmits an authentication code to the mobile terminal 120 on the basis of the result of the login. The authentication code is used to acquire an access token. Accordingly, in step 108, in order to receive the access token, the mobile terminal 120 transmits the received authentication code to the authentication server 130. Here, the mobile terminal 120 may display, on a screen thereof, the authentication code received from the authentication server 130, and may receive an authentication code as input from the user and may transmit the received authentication code to the authentication server 130.

The authentication server 130 receives an authentication code from the mobile terminal 120, and in step 110, transmits the access token to the mobile terminal 120 when the received authentication code is identical to the authentication code transmitted in step 106. Then, in step 112, the mobile terminal 120 sends a request for a service to the service providing server 140 by using the access token. When the App is a web-based App, an operation of requesting the service may include an operation of invoking an API, and the like.

Meanwhile, the typical authentication process for using a service as illustrated in FIG. 1 needs to receive, as input, login information, an authentication code, and the like from the user, and accordingly, may not be performed by a device that does not include an input/output interface. Also, the typical authentication process needs to receive a password and the like as input from the user even when an open API is processed, and has a problem of poor security since the relevant password is stored in a web cookie and the like.

Also, even when a remote access service is provided by using a Network Address Translator (NAT) Traversal Solution (NTS) and the like, the typical authentication process requires a token re authentication procedure, and is problematic in that the typical authentication process cannot but be performed based on an input by the user. These problems will be described in detail with reference to FIG. 2.

Figure 2:
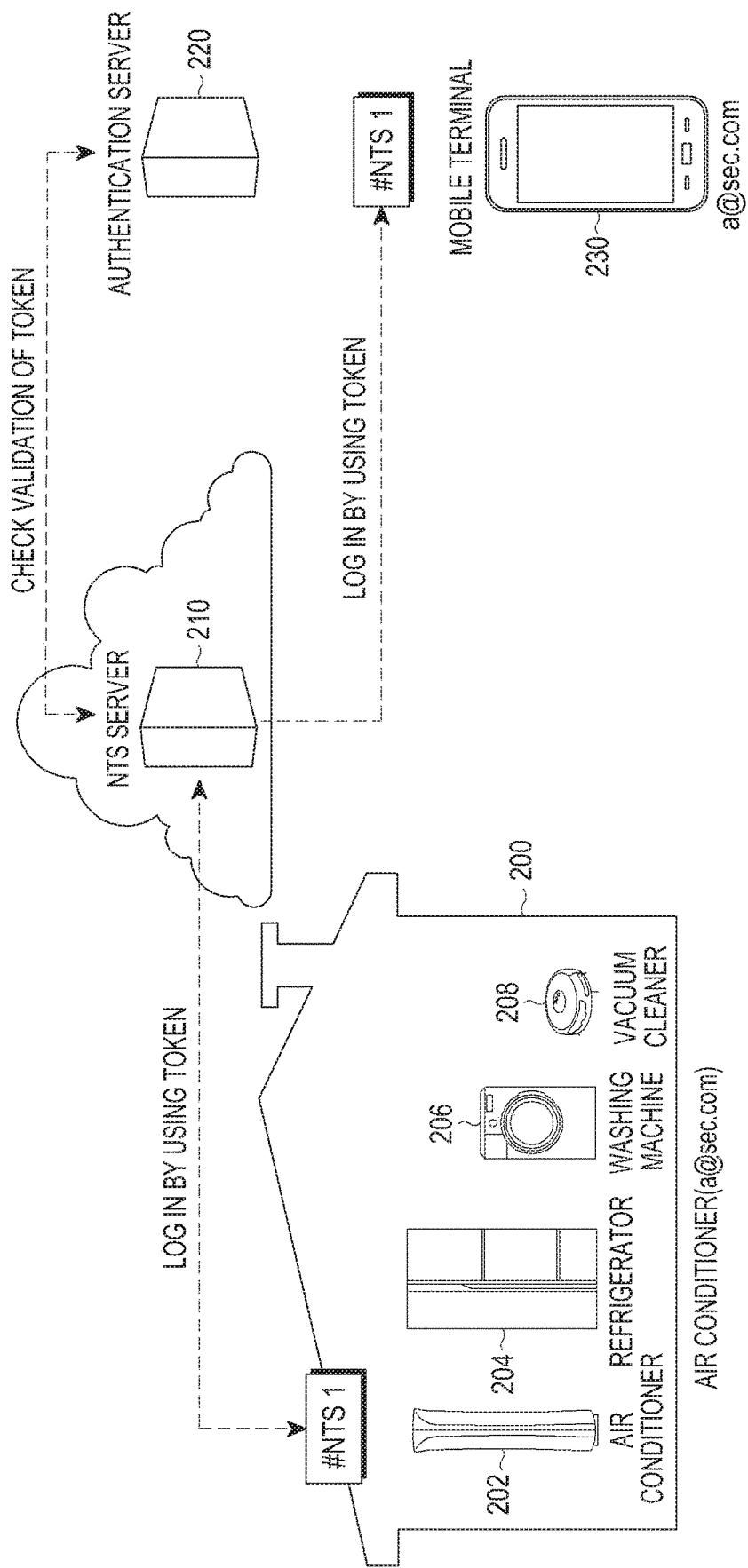
FIG. 2 is a view illustrating a wireless communication system in which a typical authentication process is performed.

FIG. 2 is a view illustrating a wireless communication system in which a typical authentication process is performed.

Referring to FIG. 2, the wireless communication system includes, for example, multiple devices (e.g., an air conditioner 202, a refrigerator 204, a washing machine 206, a vacuum cleaner 208, etc.) included in a home network 200, a service providing server (e.g., an NTS server) 210, an authentication server 220, and a mobile terminal 230 that is included in a group identical to a group including the multiple devices and is located outside the home network 200. Here, the multiple devices and the mobile terminal 230 may be controlled by an identical user, and accordingly, are included in an identical group having account information (e.g., "a@sec.com") of the identical user.

At least one of the multiple devices and the mobile terminal 230 sends a request for a login, to the NTS server 210 by using an access token. Then, the NTS server 210 checks whether the access token is valid which has been used when each of the at least one of the multiple devices and the mobile terminal 230 has requested the login. Specifically, the NTS server 210 transmits an access token to the authentication server 220, and then receives, from the authentication server 220, a result of determining whether the relevant access token is an authenticated access token.

When the relevant access token is an authenticated access token, the NTS server 210 transmits a message, which indicates that the login has been approved, to the at least one of the multiple devices and the mobile terminal 230. Then, the NTS server 210 transmits information on a device (i.e., the at least one device that succeeds in performing the login), with which the mobile terminal 230 is capable of communicating, to the mobile terminal 230. Here, the information on the device, with which the mobile terminal 230 is capable of communicating, may include a group ID, a peer ID, an Internet Protocol (IP) address, and the like which are related to the relevant device.

For example, when the air conditioner 202 succeeds in performing the login, the NTS server 210 transmits information on the air conditioner 202 to the mobile terminal 230. The information on the air conditioner 202 may be as shown in Table 1 below as an example, and the peer ID may be generated based on a Media Access Control (MAC) address (e.g., "00-00-00-01-02-03") of the air conditioner 202.

TABLE 1

| Group ID | gulnoevz0p |
|---|---|
| Peer ID | MAC:000000010203000 |
| IP address | 100.100.100.101 |

Each of the refrigerator 204, the washing machine 206, and the vacuum cleaner 208 may have information having a form similar to that of the information of the air conditioner 202 shown in Table 1, and may transmit the relevant information to the NTS server 210 during a login.

The mobile terminal 230 may have information as shown in Table 2 below. Here, a peer ID of the mobile terminal 230 may be generated based on an International Mobile Equipment Identity (IMEI) (e.g., "333322222111111").

TABLE 2

| Group ID | gulnoevz0p |
|---|---|
| Peer ID | IMEI:333322222111111 |
| IP address | 203.241.176.300 |

When the mobile terminal 230 has received the information on the air conditioner 202 from the NTS server 210, the mobile terminal 230 may add the information on the air conditioner 202 to peer management information shown in Table 3 below. Then, the mobile terminal 230 may communicate with a device included in the peer management information. Differently from Table 3 below, the information on the mobile terminal 230 may be omitted from the peer management information used by the mobile terminal 230.

TABLE 3

| Device name | Peer ID | IP address |
|---|---|---|
| Mobile terminal | IMEI:333322222111111 | 203.241.176.300 |
| Air conditioner | MAC:000000010203000 | 100.100.100.101 |
| ... | ... | ... |

In the above-described typical wireless communication system, the multiple devices and the mobile terminal 230 communicate with each other by using an access token. The access token has a determined time period for use, and needs to be updated when the time period for use thereof expires.

However, in the typical authentication process illustrated in FIG. 1, consideration is not given to issues, such as how to perform a reauthentication procedure when the time period for use of the access token expires, and how a device, that does not include an input/output interface, acquires and updates an access token without making an input by a user.

Accordingly, an embodiment of the present invention proposes a method and a device which, in view of the above-described issues, enable even the device, that does not include an input/output interface, to receive authentication and to periodically update an access token used in an authentication process.

Hereinafter, an embodiment of the present invention will be described in detail.

Figure 3:
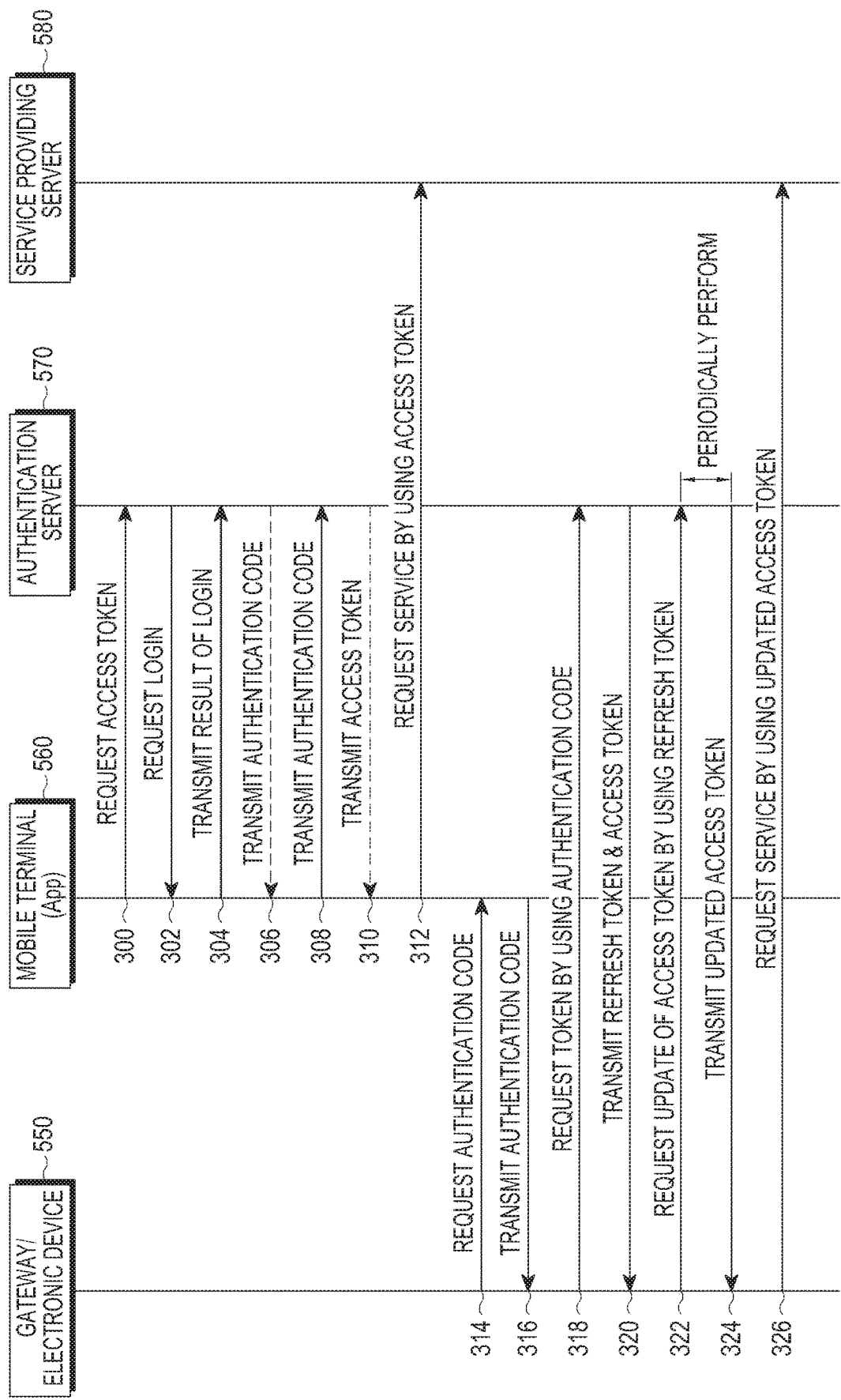
FIG. 3 is a signal flow diagram illustrating an authentication process for using a service according to an embodiment of the present invention.

FIG. 3 is a signal flow diagram illustrating an authentication process for using a service according to an embodiment of the present invention.

As illustrated in FIG. 3, the authentication process for using a service according to an embodiment of the present invention may be performed by a mobile terminal 560 including an App used by a user, an authentication server 570 that authenticates whether the user of the App is an appropriate user, a service providing server 580 that provides a service related to the App, an electronic device or a gateway 550 capable of being connected to the mobile terminal 560, and the like.

Steps 300 to 312 in FIG. 3 are similar to steps 100 to 112 in FIG. 1, and thus, a detailed description thereof will be omitted. When Steps 300 to 312 in FIG. 3 are performed, the mobile terminal 560 may acquire an authentication code for using a service. Accordingly, when the gateway/electronic device 550 sends a request for an authentication code to the mobile terminal 560 in step 314, in step 316, the mobile terminal 560 may transmit the authentication code to the gateway/electronic device 550.

An access token is required for using a service, and the access token may be acquired based on the authentication code. Accordingly, in step 318, the gateway/electronic device 550 sends a request for a token to the authentication server 570 by using the authentication code. Then, in step 320, the authentication server 570 transmits a refresh token and an access token to the gateway/electronic device 550.

A token request message in step 318 is as shown in Table 4 below as an example.

TABLE 4

POST : https://auth.samsungosp.com/auth/oauth2/token
HTTP/1.1
Connection : close
Content-type : application/x-www-form-urlencoded
User-Agent : Jakarta Commons-HttpClient/3.1
Host : auth.samsungosp.com
Content-Length : 166
?
scope=default&
grant_type=authorization_code&
service_type=M&
client_id=c7hc8m4900&
client_secret=B5B9B48012665C4F1914C52B4B6DD2F4&
code=G0N2ofYIF9

In Table 4, "grant_type" indicates a different meaning according to a set value, and "grant_type=authorization_code&" represents the exchange of an authentication code for an access code. Also, in Table 4, "code" represents an authentication code, "service_type" represents a service type, "client_id" represents a client ID for identifying a client, and "client_secret" represents a client password.

The refresh token and the access token in step 320 may be delivered through a message shown in Table 5 below as an example.

Table 5

HTTP/1.1 200 OK
{
 "access_token":"9y5Vugj7cM",
 "token_type":"bearer",
 "access_token_expires_in":2592000,
 "expires_in":2592000,
 "refresh_token":"Tit8B3acNh",
 "refresh_token_expires_in":7776000,
 "userId":"60bkswda8e"
}

In Table 5, "access_token" represents an access token, and "refresh_token" represents a refresh token. Also, "token_type" represents the type of a token, "userId" represents a user ID, and "access_token_expires_in" and "refresh_token_ expires_in" represent time periods for expiration of use of an access token and a refresh token, respectively.

The refresh token, which is a token capable of being used to acquire a new access token, may be issued together with the new access token, and may be used to request the update of the access token. For example, when a time period for use of the access token expires and it is necessary to update the access token, the refresh token may be used instead of the access token in order to request the update of the access token. Accordingly, a time period for use of the refresh token is typically set to be longer than that of the access token (e.g., the refresh token: 90 days and the access token: 30 days).

In step 322, in view of these issues, the gateway/electronic device 550 requests the authentication server 570 to provide a new access token, by using the refresh token. At this time, information shown in Table 6 below may be transmitted to the authentication server 570.

TABLE 6

POST https://auth.samsungosp.com/auth/oauth2/token
HTTP/1.1
Connection: close
Content-Type: application/x-www-form-urlencoded
User-Agent: Jakarta Commons-HttpClient/3.1
Host: auth.samsungosp.com
Content-Length: 170
?
refresh_token= Tit8B3acNh&
client_id=c7hc8m4900&
grant_type=refresh_token&
client_secret=B5B9B48012665C4F1914C52B4B6DD2F4&
physical_address_text=420808cf6fc47f07&
service_type=M In Table 6, "grant_type=refresh_token&" represents the exchange of a refresh token for a new access code (i.e., a request for providing the new access code, according to the transmission of the refresh token).

Then, in step 324, the authentication server 570 generates a new access token and transmits the newly-generated access token to the gateway/electronic device 550. At this time, a new refresh token together with the new access token may be transmitted to the gateway/electronic device 550 as shown in Table 7 below.

HTTP/1.1 200 OK
{
 "access_token":"pN7s7FiWX9",
 "token_type":"bearer",
 "access_token_expires_in":2592000,
 "refresh_token":"mXFzloS9Gl",
 "refresh_token_expires_in":7776000,
 "userId":"cntslpbig4"
}

When Table 5 shown above is compared with Table 7 shown above, it can be noted that the access token and the refresh token are updated.

In step 326, the gateway/electronic device 550 sends a request for a service to service providing server 580 by using the new access token. Then, the gateway/electronic device 550 periodically performs the access token update process described in steps 322 and 324.

As illustrated in FIG. 3, in an embodiment of the present invention, authentication information (e.g., an authentication code) of the mobile terminal 560 may be shared between the mobile terminal 560 and the gateway/electronic device 550, and thereby, even a device that does not include an input/output interface may perform an authentication process and may use a service. Also, the access token update process is periodically performed, and accordingly, the use of a service, which ensures security, may be accomplished.

Meanwhile, the authentication method according to an embodiment of the present invention largely includes three processes. The three processes include a network configuration process for connecting between a mobile terminal and a gateway/electronic device (hereinafter simply referred to as an "electronic device"), a process in which the mobile terminal registers the electronic device and provides the electronic device with information enabling the electronic device to log in to an authentication server and a service providing server, and a process enabling an access token to be periodically updated.

Hereinafter, the three respective processes will be described in detail.

(1) A network Configuration Process

In order for the mobile terminal to share authentication information and the like with the electronic device, the mobile terminal and the electronic device need to be connected to each other. To this end, the following network configuration process may be performed.

Figure 4:
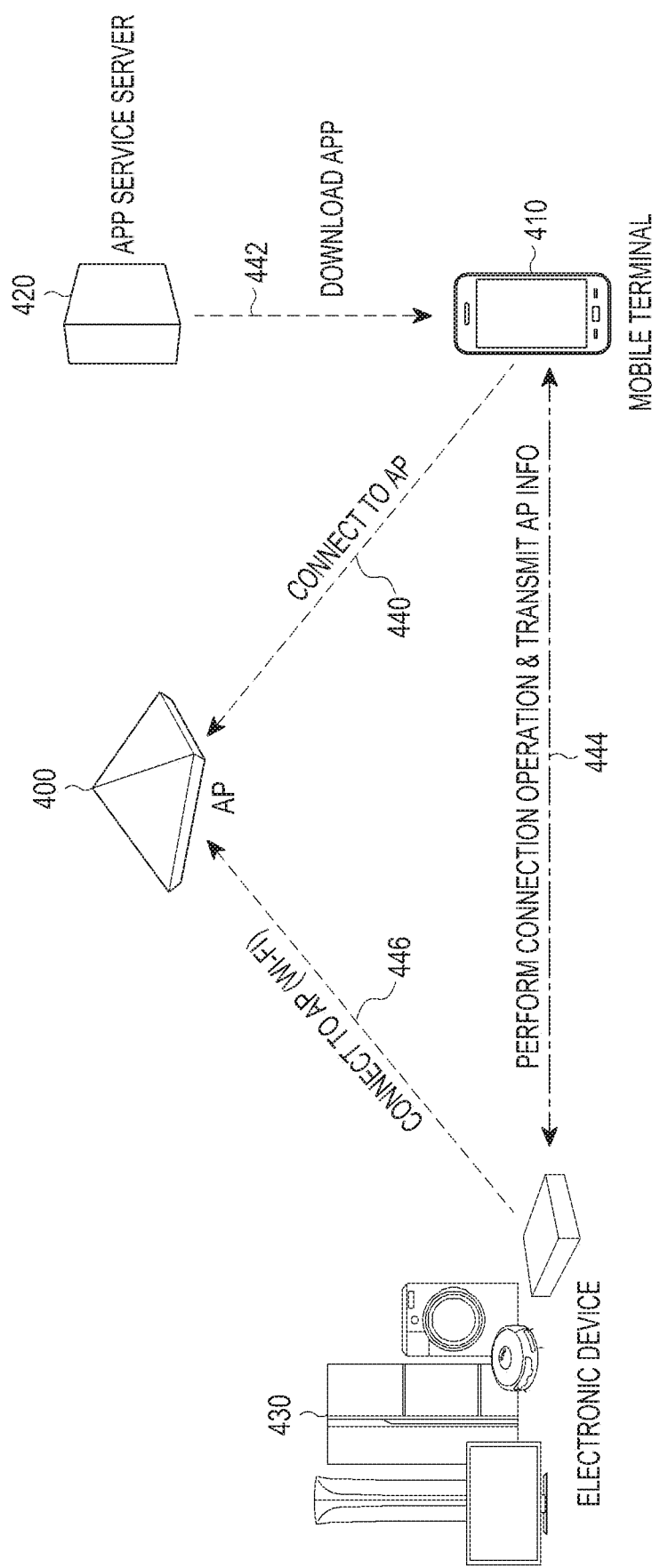
FIG. 4 is a view illustrating a network configuration process performed in a wireless communication system according to an embodiment of the present invention.

FIG. 4 is a view illustrating a network configuration process performed in a wireless communication system according to an embodiment of the present invention.

Referring to FIG. 4, the wireless communication system includes an AP 400, a mobile terminal 410, an App service server 420, and an electronic device 430. In step 440, the mobile terminal 410 connects to (accesses) the AP 400. Then, the mobile terminal 410 acquires information (device information, such as a MAC address, etc., App Uniform Resource Locator (URL) information, etc.) on the electronic device 430 from the electronic device 430 through Near Field Communication (NFC) and the like.

Then, in step 442, the mobile terminal 410 downloads an App from the App service server 420 on the basis of App URL information included in the acquired information, and installs the downloaded App. Here, the App may be an App for network configuration which enables the mobile terminal 410 to communicate with the electronic device 430. Hereinafter, the App will be referred to as an "easy-setup App."

In step 444, the mobile terminal 410 performs an operation of connecting to the electronic device 430 by using the easy-setup App, and transmits information on the AP 400 to the electronic device 430. Then, in step 446, the electronic device 430 performs an operation of connecting to the AP 400 on the basis of the received information on the AP 400. When the electronic device 430 is connected to the AP 400, the electronic device 430 may communicate with the mobile terminal 410 through Wi-Fi communication.

Meanwhile, the network configuration process according to an embodiment of the present invention may be more specifically performed on the basis of Wi-Fi communication and Bluetooth communication, and these configurations will be described with reference to FIGS. 5 and 6, respectively.

Figure 5:
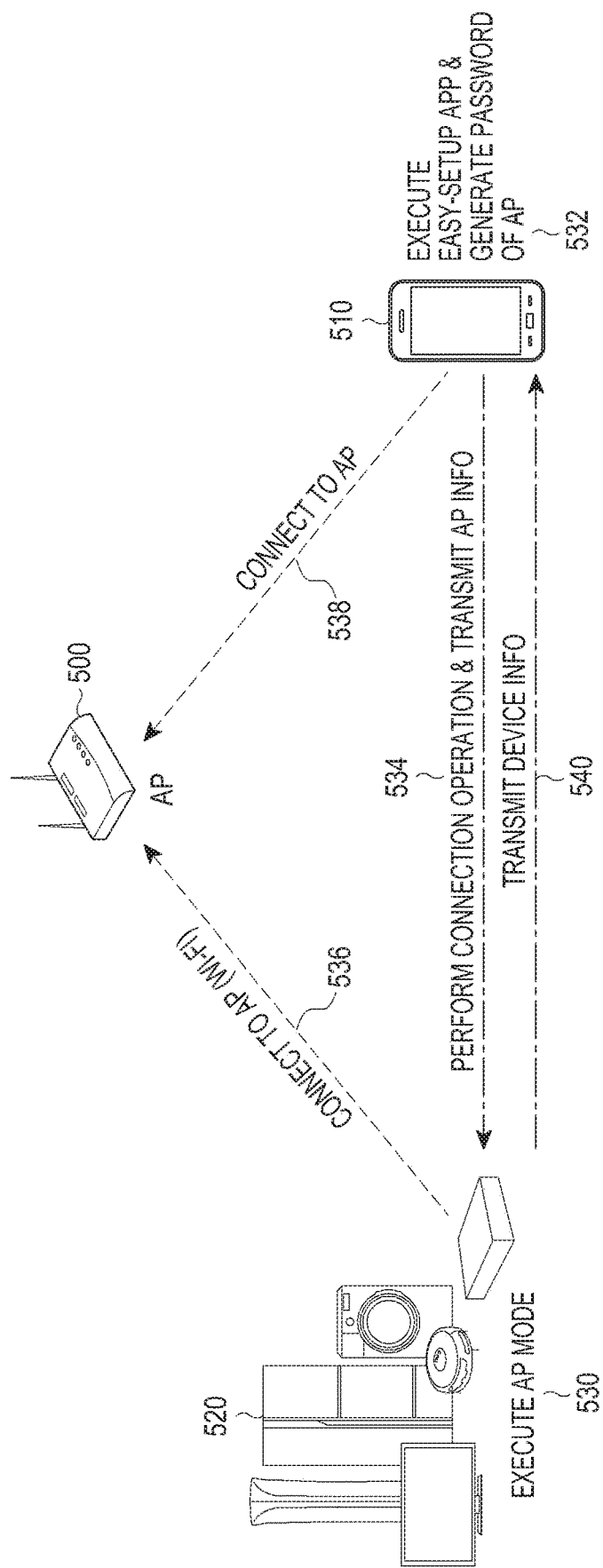
FIG. 5 is a view illustrating a network configuration process performed by using Wi-Fi communication in a wireless communication system according to an embodiment of the present invention.

FIG. 5 is a view illustrating a network configuration process performed by using Wi-Fi communication in a wireless communication system according to an embodiment of the present invention.

Referring to FIG. 5, in step 530, an electronic device 520 executes an AP mode according to an input by a user and the like. The AP mode is a mode which is set to cause the electronic device 520 to perform an operation of connecting to an AP 500.

Meanwhile, in step 532, a mobile terminal 510 executes an easy-setup App, and generates a password of the AP 500. For example, the password may be generated by using a hash function on the basis of a Service Set IDentifier (SSID) (e.g., SPC+serial number="SPC 80C578LS4P") and a MAC address of the AP 500 (Hash(SSID II MAC)="ccbdab15b346d33ec838a361998cc41a962fc66 (SHA-1)").

In step 534, the mobile terminal 510 performs an operation of connecting to the electronic device 520, and transmits AP information (i.e., the SSID and the password, etc. of the AP 500) to the electronic device 520. Then, in step 536, the electronic device 520 may be connected to the AP 500 and may perform Wi-Fi communication on the basis of the received information on the AP 500.

Meanwhile, when the mobile terminal 510 is connected to the AP 500 in step 538, the mobile terminal 510 and the electronic device 520 may perform wireless communication with each other on the basis of Wi-Fi communication. Accordingly, in step 540, the electronic device 520 transmits device information on the electronic device 520 to the mobile terminal 510 by using the Wi-Fi communication. The information on the electronic device 520 may include a group ID, a peer ID, an IP address, and the like of the electronic device 520.

Figure 6:
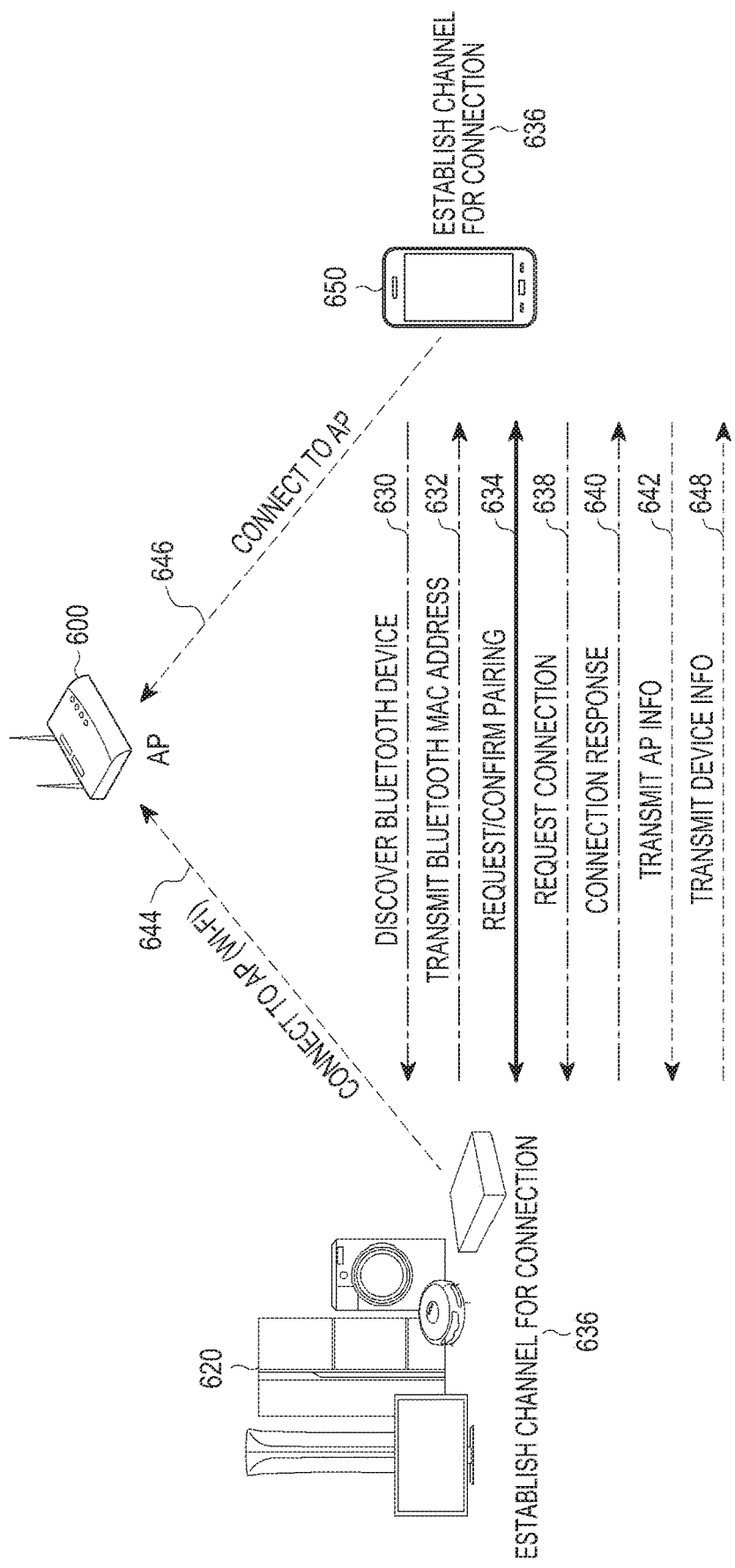
FIG. 6 is a view illustrating a network configuration process performed by using Bluetooth communication in a wireless communication system according to an embodiment of the present invention.

FIG. 6 is a view illustrating a network configuration process performed by using Bluetooth communication in a wireless communication system according to an embodiment of the present invention.

Referring to FIG. 6, when a mobile terminal 650 discovers an electronic device 620 through Bluetooth communication in step 630, in step 632, the mobile terminal 650 receives a Bluetooth MAC address from the electronic device 620. Then, in step 634, the mobile terminal 650 transmits a pairing request to the electronic device 620. When the mobile terminal 650 receives a confirmation message indicating the acceptance of the pairing request from the electronic device 620 in step 634, in step 636, the mobile terminal 650 establishes a channel to be used to connect to the electronic device 620.

When the channel establishment has been completed, in step 638, the mobile terminal 650 sends, to the electronic device 620, a request for a connection. Then, in step 638, when the mobile terminal 650 receives, from the electronic device 620, a connection response indicating the acceptance of the connection request, in step 642, the mobile terminal 650 transmits information on an AP 600 to the electronic device 620.

Then, in step 644, the electronic device 620 may be connected to the AP 600 and may perform Wi-Fi communication on the basis of the received information. Next, when the mobile terminal 650 is connected to the AP 600 and is detected by the electronic device 620, in step 648, the electronic device 620 transmits device information on the electronic device 620 to the mobile terminal 650. The information on the electronic device 620 may include a group ID, a peer ID, an IP address, and the like of the electronic device 620.

Figure 7:
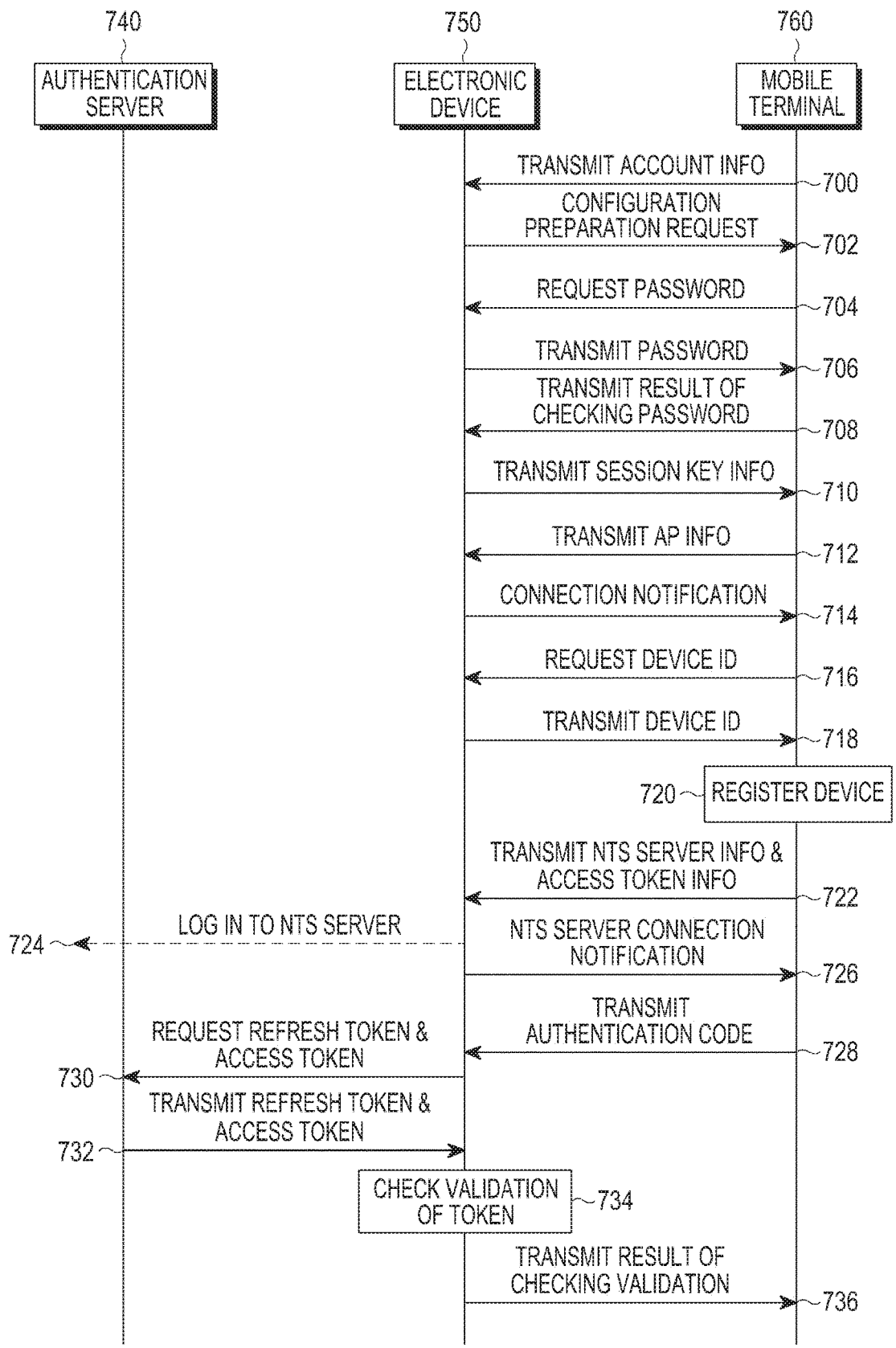
FIG. 7 is a detailed view illustrating a process for transmitting and receiving device information between an electronic device and a mobile terminal according to an embodiment of the present invention.

FIG. 7 is a detailed view illustrating a process for transmitting and receiving device information between an electronic device and a mobile terminal according to an embodiment of the present invention.

Referring to FIG. 7, in step 700, a mobile terminal 760 transmits account information (e.g., "abc@sec.com") to an electronic device 750. The electronic device 750 receives the account information, and in step 702, transmits a configuration preparation request message to the mobile terminal 760 when the received account information coincides with pre-stored account information.

In step 704, the mobile terminal 760 sends a request for a password to the electronic device 750. Then, in step 706, the electronic device 750 transmits the password to the mobile terminal 760. The mobile terminal 760 checks whether the password received from the electronic device 750 is identical to a pre-stored password, and in step 708, transmits a result of the check to the electronic device 750.

When the result of the check shows that the password is identical to the pre-stored password, in step 710, the electronic device 750 transmits session key information to the mobile terminal 760. Next, in step 712, the mobile terminal 760 transmits AP information to the electronic device 750. Then, the electronic device 750 performs an operation of connecting to an AP on the basis of the AP information. When the connection to the AP has been completed, in step 714, the electronic device 750 transmits a message, which notifies of the connection of the electronic device 750 to the AP, to the mobile terminal 760.

According to the connection of the electronic device 750 to the AP, the mobile terminal 760 may communicate with the electronic device 750 through Wi-Fi. Accordingly, in step 716, the mobile terminal 760 sends a request for information (e.g., a device ID) on the electronic device 750 to the electronic device 750 through Wi-Fi communication. In step 718, the electronic device 750 transmits the information on the electronic device 750 to the mobile terminal 760 according to the request. Then, in step 720, the mobile terminal 760 registers the electronic device 750 in a separate server (hereinafter referred to as a "device information management server") for registering and managing device information, on the basis of the received information.

Meanwhile, in step 722, the mobile terminal 760 transmits, to the electronic device 750, information on an NTS server and information on an access token. Here, the NTS server is a service providing server, and indicates a server for providing a service which enables the mobile terminal 760 to control a registered electronic device through wireless communication. Hereinafter, although a case where the service providing server is the NTS server is described as an example, according to an embodiment of the present invention, the service providing server is not limited to the NTS server, but may be another server.

In step 724, the electronic device 750 logs in to the NTS server on the basis of the NTS server information on. Next, when the electronic device 750 succeeds in logging in to the NTS server and is connected to the NTS server, in step 726, the electronic device 750 transmits an NTS server connection notification message, which notifies of the connection of the electronic device 750 to the NTS server, to the mobile terminal 760. Then, in step 728, the mobile terminal 760 transmits an authentication code, which is used to acquire an access token, to the electronic device 750.

In step 730, the electronic device 750 sends a request for a refresh token and an access token to an authentication server 740 by using the authentication code. Then, in step 732, the authentication server 740 transmits the refresh token and the access token to the electronic device 750 on the basis of whether the authentication code is identical to a preset authentication code.

In step 734, the electronic device 750 checks the validation of the access token, and in step 736, transmits, to the mobile terminal 760, a result of checking the validation.

Specifically, the electronic device 750 checks whether a time period for use of the access token has expired. When a time period for use of the refresh token expires, the access token needs to be updated. Accordingly, so as to enable the mobile terminal 760 to update an access token at an appropriated time point, the electronic device 750 transmits, to the mobile terminal 760, information on whether it is necessary to update the access token, as a result of checking the validation.

Figure 8:
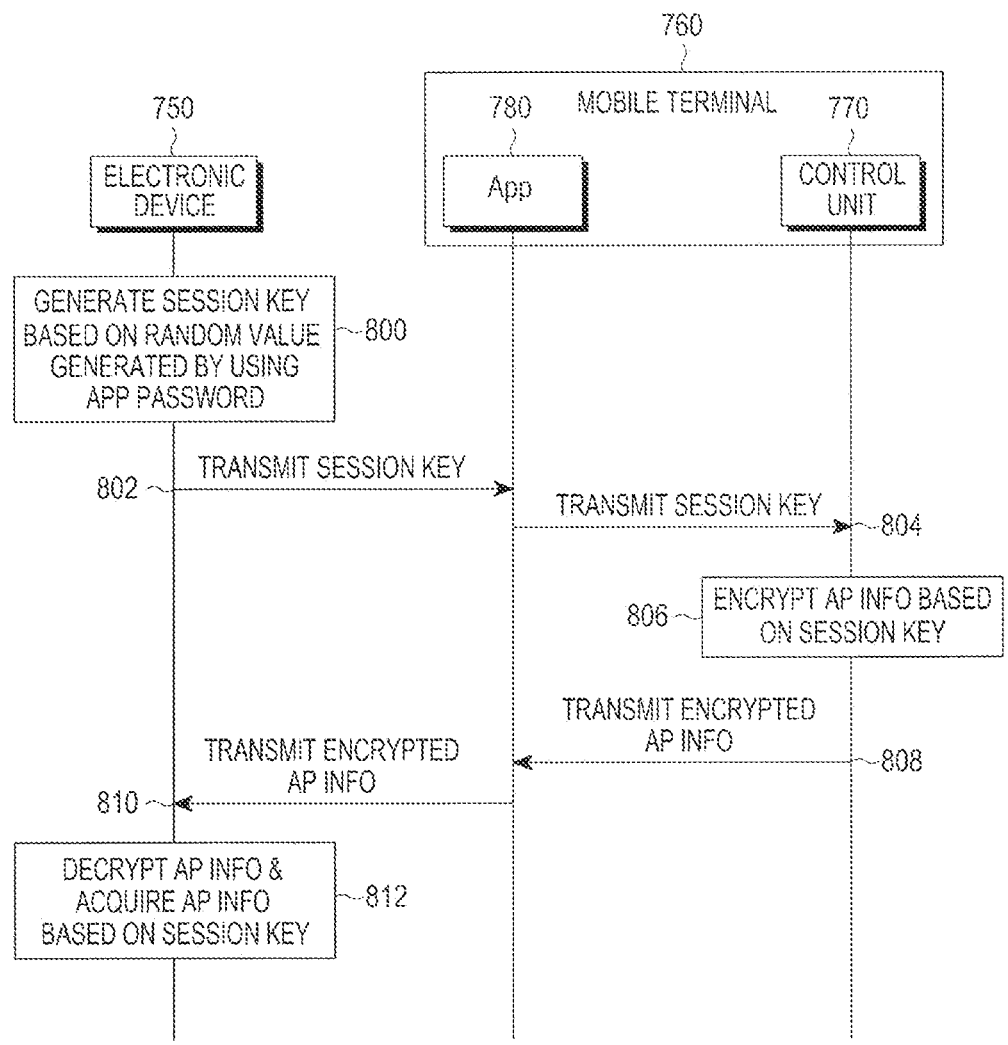
FIG. 8 is a signal flow diagram illustrating a process for transmitting and receiving session key-based Access point (AP) information between a mobile terminal and an electronic device according to an embodiment of the present invention.

Meanwhile, an operation of transmitting and receiving session key-based AP information described in steps 710 and 712 is as illustrated in FIG. 8.

FIG. 8 is a signal flow diagram illustrating a process for transmitting and receiving session key-based AP information between a mobile terminal and an electronic device according to an embodiment of the present invention.

Referring to FIG. 8, in step 800, the electronic device 750 generates a session key on the basis of a random value generated by using an App password, and in step 802, transmits the generated session key to the mobile terminal 760. The mobile terminal 760 may include a wireless unit (not illustrated) for performing wireless communication with the electronic device 750, a control unit 770 that controls all configuration units within the mobile terminal 760 and processes an overall operation of the mobile terminal 760, an App 780, and the like.

When the wireless unit receives the session key, in step 804, the App 780 delivers the received session key to the control unit 770. Then, in step 806, the control unit 770 encrypts AP information (e.g, an SSID, a password, etc.) on the basis of the session key, and in step 808, transmits the encrypted AP information to the App 780. Then, in step 810, the App 780 transmits the encrypted AP information to the electronic device 750 through the wireless unit.

In step 812, the electronic device 750 decrypts the encrypted AP information and acquires the AP information on the basis of the session key generated in step 800.

(2) A Process for NTS Login and Token Configuration

When the above-described network configuration process has been completed, a provisioning process may be performed which enables a mobile terminal to control an electronic device in an indoor place or an outdoor place where the relevant electronic device is located. The provisioning process includes a process in which the mobile terminal registers information on the electronic device in a device information management server, transmits information enabling the electronic device to log in to an authentication server and an NTS server, and the like.

Hereinafter, the provisioning process will be described with reference to FIG. 9.

Figure 9:
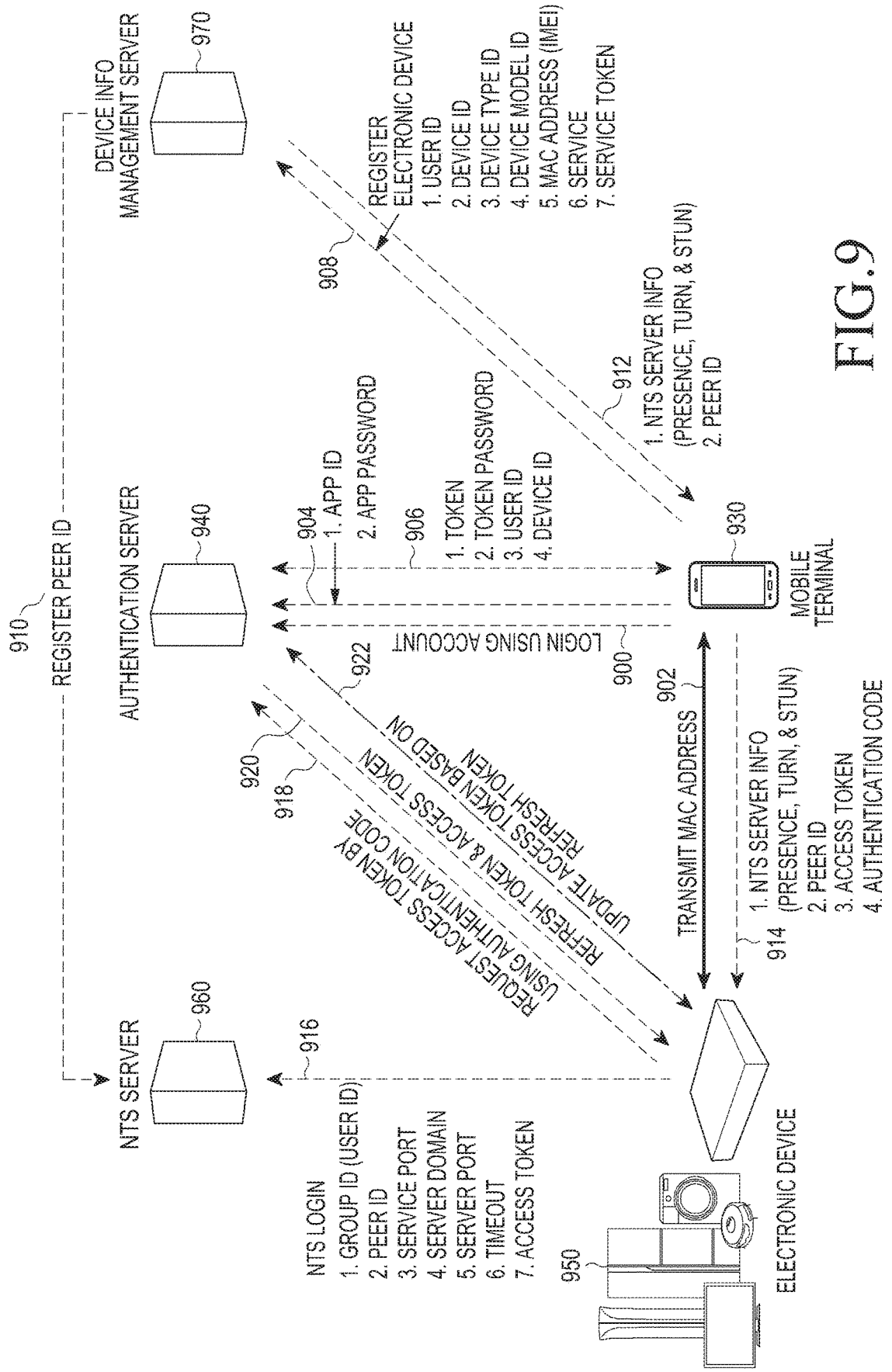
FIG. 9 is a signal flow diagram illustrating a provisioning process performed in a wireless communication system according to an embodiment of the present invention.

FIG. 9 is a signal flow diagram illustrating a provisioning process performed in a wireless communication system according to an embodiment of the present invention.

Referring to FIG. 9, in step 900, a mobile terminal 930 logs in to an authentication server 940 by using account information. Here, the authentication server 940 may be an account server and the like that manage an account and the like of a user.

The mobile terminal 930 performs a device search process through Wi-Fi communication. At this time, the mobile terminal 930 may perform a device search process by using a Universal Plug and Play (UPnP) discovery method and the like. When the mobile terminal 930 discovers an electronic device 950 through the device search process, in step 902, the mobile terminal 930 receives information on the electronic device 950 from the electronic device 950. The information on the electronic device 950 may include information, such as an IP address, a MAC address, and the like of the electronic device 950.

The information of the electronic device 950 may be received according to a request of the mobile terminal 930, or may be received through a device registration process and the like. For example, the electronic device 950 transmits a device registration request message, which includes the information of the electronic device 950, to the mobile terminal 930 through a Wi-Fi Direct session.

Then, the mobile terminal 930 stores the information of the electronic device 950, and transmits a device registration response message, which indicates the registration of the electronic device 950 in the mobile terminal 930, to the electronic device 950. Here, the information of the electronic device 950 may be temporarily stored in the mobile terminal 930 until the relevant information is registered in a device information management server 970.

The mobile terminal 930 performs a service authorization process for acquiring an access token and the like for using a service.

Specifically, in step 904, the mobile terminal 930 transmits an App ID and an App password to the authentication server 940 in order to obtain permission for the use of a service. When the App ID and the App password are respectively identical to a preset App ID and a preset App password, the authentication server 940 transmits, to the mobile terminal 930, an access token, a token password, a user ID, and a device ID and an authentication code of the mobile terminal 930, as information for using the service. In step 906, the mobile terminal 930 receives, from the authentication server 940, the access token, the token password, the user ID, and the device ID and the authentication code of the mobile terminal 930. Then, the mobile terminal 930 determines whether the mobile terminal 930 is to register the electronic device 950 in the device information management server 970, on the basis of the received information and the information of the electronic device 950 which has been received in step 902.

When the electronic device 950 is not registered in the device information management server 970, in step 908, the mobile terminal 930 uploads the electronic device 950 to the device information management server 970 and registers the electronic device 950 in the device information management server 970. Here, the user ID, a device ID of the electronic device 950, a device type ID indicating the type of the electronic device 950, a device model ID indicating a model of the electronic device 950, a MAC address (or an IMEI) of the electronic device 950, service information capable of being used by the mobile terminal 930 in relation to the electronic device 950, and information on a service token for using a service according to the service information may be registered in the device information management server 970. Accordingly, the electronic device 950 may be registered in the device information management server 970. The information of the electronic device 950 registered in the device information management server 970 may be acquired in step 902.

When the electronic device 950 is registered in the device information management server 970, in step 910, the device information management server 970 transmits a peer ID of the electronic device 950 to an NTS server 960. The peer ID of the electronic device 950 which has been transmitted to the NTS server 960 may be used as information used to perform authentication when the electronic device 950 subsequently logs in to the NTS server 960.

In step 912, the device information management server 970 generates a peer ID, which is used to access the NTS server 960, together with information (domain information, an IP address, a port number, etc. which are used to access the NTS server 960) on the NTS server 960 that the electronic device 950 may access, and transmits, to the mobile terminal 930, the generated peer ID and the generated information on the NTS server 960. The information related to the NTS server 960, which is transmitted to the mobile terminal 930, may be transmitted according to a request of the mobile terminal 930. For example, when the device information management server 970 receives, from the mobile terminal 930, a service server information request message for acquiring information on a service server such as the NTS server 960, the device information management server 970 may transmit, to the mobile terminal 930, a service server information response message including the information (the IP address, the port number, etc. of the NTS server 960) on the NTS server 960. The information on the NTS server 960 may be transmitted before step 906 has been completed and step 908 is started, instead of being transmitted to the mobile terminal 930 in step 912.

The mobile terminal 930 receives the relevant information from the device information management server 970, and in step 914, transmits, to the electronic device 950, authentication server information, NTS server information, a peer ID, and information on an access token and an authentication code. The electronic device 950 receives, from the mobile terminal 930, the authentication server information, the NTS server information, the peer ID, and the information on the access token and the authentication code, and uses the received pieces of information as information for accessing the NTS server 960 and information for periodically updating an access token. In step 916, the electronic device 950 logs in to the NTS server 960 by using the user ID (a group ID), the peer ID, a service port, a server domain, a server port, timeout information, and the access token.

When the login is approved, in step 918, the electronic device 950 sends a request for an access token to the authentication server 940 by using the authentication code. For example, the electronic device 950 transmits an access token request message, which includes the authentication code, to the authentication server 940. When the authentication code is identical to a preset authentication code, in step 920, the authentication server 940 transmits a refresh token and an access token to the electronic device 950.

When a time period for use of the access token expires, in step 922, the electronic device 950 sends a request for updating the access token to the authentication server 940 by using the refresh token. Then, the authentication server 940 generates a new access token to be used instead of the previously-used access token, and transmits the newly-generated access token to the electronic device 950. Then, the electronic device 950 uses the new access token as an access token for logging in to the NTS server 960.

When the above-described process has all been completed, the mobile terminal 930 finally sets additional information for agreement to the terms, the initialization of the electronic device 950, and the like, and then completes the entire provisioning process.

Figure 10:
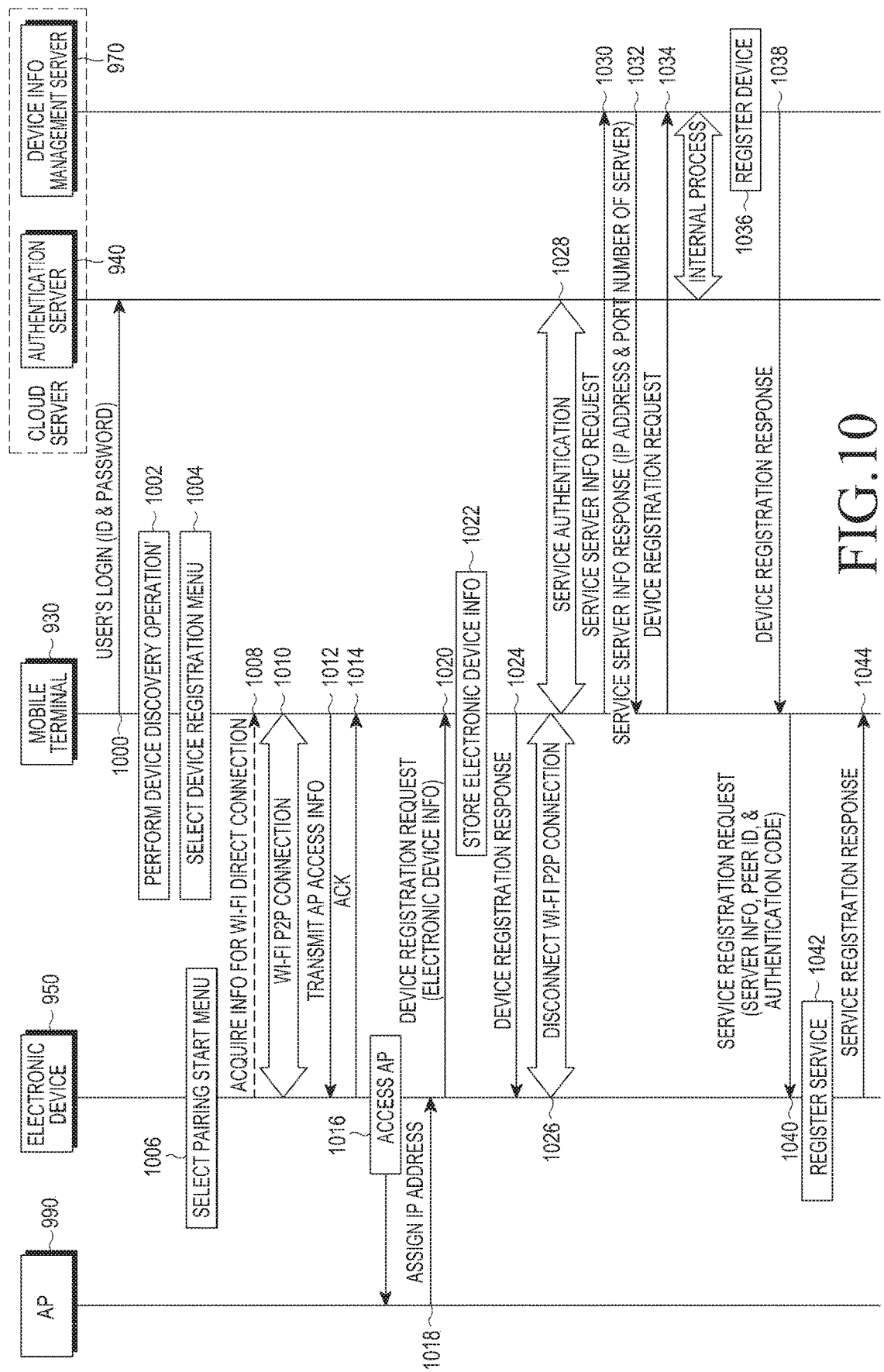
FIG. 10 is a signal flow diagram procedurally illustrating a provisioning process performed in a wireless communication system according to an embodiment of the present invention.

The provisioning process performed in the wireless communication system, which has been described with reference to FIG. 9, is as illustrated in FIG. 10 in more detail.

FIG. 10 is a signal flow diagram procedurally illustrating a provisioning process performed in a wireless communication system according to an embodiment of the present invention.

Referring to FIG. 10, in step 1000, the mobile terminal 930 logs in to the authentication server 940 by using an account of a user (an ID and a password of the user). For example, when a smart home App is executed which enables the user of the mobile terminal 930 to control the electronic device 950 by using the mobile terminal 930 (a controller device), the ID and the password of the user associated with the smart home App may be transmitted to the authentication server 940.

When the mobile terminal 930 receives a message, which indicates the success of the login, from the authentication server 940, in step 1002, the mobile terminal 930 performs a device discovery operation. The device discovery operation indicates an operation of discovering a device (a smart home gateway, etc.) to be automatically registered. When a device does not exists within a local network, the mobile terminal 930 recognizes that the device does not exists, and notifies the user of the non-existence of the device by using a method, such as a method for displaying a device on a screen so as to be capable of manually registering the device.

In step 1004, the user of the mobile terminal 930 may select a device registration menu within the smart home App, and in step 1006, may select a pairing start menu of the electronic device 950. The pairing start menu may be selected in the electronic device 950 in order to prepare for a direct pairing of the electronic device 950 with the mobile terminal 930. The pairing start menu and the device registration menu may be selected by a physical button, a software button, a button of a remote control, or the like. When the user selects the pairing start menu, a Wi-Fi Direct mode, which enables the electronic device 950 to be directly connected to the mobile terminal 930 through Wi-Fi communication, is executed in the electronic device 950.

In step 1008, the mobile terminal 930 acquires information for a Wi-Fi Direct connection with the electronic device 950. For example, the mobile terminal 930 acquires the information for the Wi-Fi Direct connection with the electronic device 950 by reading a QR code attached to the electronic device 950, by tagging NFC, or by using Infrared light (IR). Here, the information for the Wi-Fi Direct connection with the electronic device 950 may be a password, a Personal Identification Number (PIN) code, an SSID, and the like. Meanwhile, examples of a method in which the mobile terminal 930 acquires the information for the Wi-Fi Direct connection may include various methods in addition to a method for reading a QR code, a method for tagging NFC, and a method for using IR.

In step 1010, the mobile terminal 930 and the electronic device 950 perform a Wi-Fi Peer-to-Peer (P2P) connection. Specifically, the mobile terminal 930 establishes a Wi-Fi Direct session with the electronic device 950 by using the information for the Wi-Fi Direct connection. Then, in step 1012, the mobile terminal 930 transmits AP access information to the electronic device 950 on the basis of the Wi-Fi Direct session. The AP access information may include an SSID of an AP 990, an authentication method (e.g., Wired Equivalent Privacy (WEP), Wi-Fi Protected Access (WPA), etc.), and information on an authentication key.

When the electronic device 950 receives the AP access information, in step 1014, the electronic device 950 transmits an ACKnowledgement (ACK) message, which indicates the reception of the AP access information, to the mobile terminal 930. Then, in step 1016, the electronic device 950 automatically starts an operation of connecting to the AP 990 by using the AP access information. Then, in step 1018, the electronic device 950 receives an IP address assigned by the AP 990.

In step 1020, the electronic device 950 transmits a device registration request message to the mobile terminal 930 through the Wi-Fi Direct session. The device registration request message may include information (the IP address of the electronic device 950, etc.) of the electronic device 950. In step 1022, the mobile terminal 930 stores the information of the electronic device 950, and in step 1024, transmits a device registration response message to the electronic device 950. Here, the information of the electronic device 950 is temporarily stored in the mobile terminal 930 until the information of the electronic device 950 is registered in the NTS server 960 which is a service server.

In step 1026, the electronic device 950 and the mobile terminal 930 cancels the Wi-Fi Direct session by disconnecting the Wi-Fi P2P connection. Then, in step 1028, the mobile terminal 930 performs a service authentication process for receiving an access token from the authentication server 940. The access token may be used to register the electronic device 950 in the NTS server 960.

In step 1030, the mobile terminal 930 transmits, to the device information management server 970, a service server information request message for acquiring information on a service server, such as the NTS server 960. Then, in step 1032, the device information management server 970 transmits, to the mobile terminal 930, a service server information response message including information (an IP address, a port number, etc. of the NTS server 960) on the NTS server 960.

In step 1034, the mobile terminal 930 transmits a device registration request message, which includes information of the electronic device 950, to the device information management server 970. Then, in step 1036, the device information management server 970 registers the electronic device 950 on the basis of the information of the electronic device 950, and in step 1038, transmits a device registration response message, which indicates the registration of the electronic device 950, to the mobile terminal 930.

In step 1040, the mobile terminal 930 transmits, to the electronic device 950, a service registration request message which includes: server information on the NTS server 960, the device information management server 970, the authentication server 940, and the like; and information, such as a peer ID, an authentication code, and the like. In step 1042, the electronic device 950 performs a registration (login) process on the NTS server 960 by using the information included in the service registration request message. Then, when the registration process has been completed, in step 1044, the electronic device 950 transmits a service registration response message to the mobile terminal 930.

(3) A Process for Acquiring and Updating a Token

Figure 11:
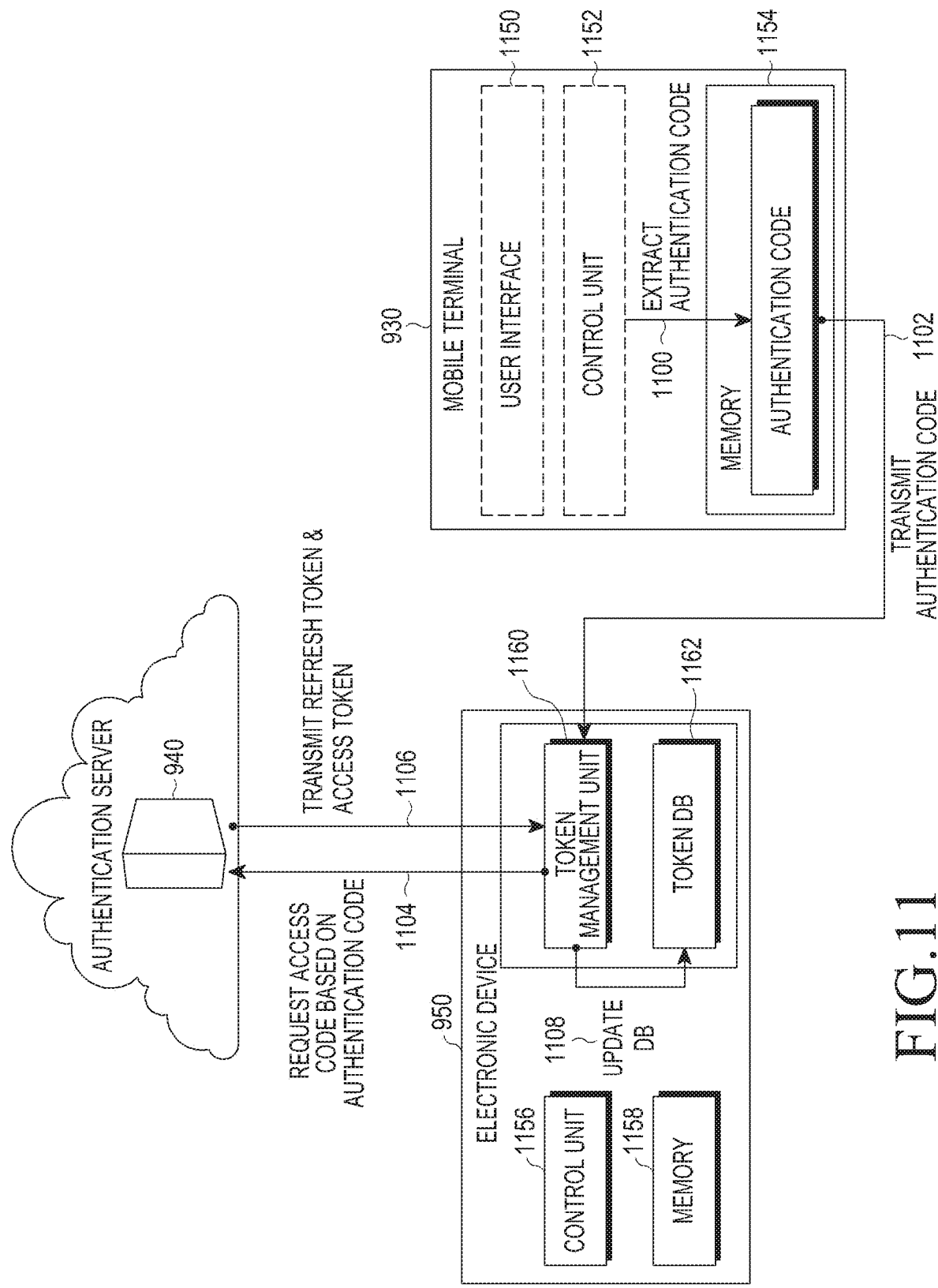
FIG. 11 is a view illustrating a process for acquiring a refresh token and an access token according to an embodiment of the present invention.

FIG. 11 is a view illustrating a process for acquiring a refresh token and an access token according to an embodiment of the present invention.

In the wireless communication system illustrated in FIG. 9, the mobile terminal 930 includes a user interface 1150, a control unit 1152, and a memory 1154. The user interface 1150 receives an input from a user or displays particular information to be provided to the user. The user interface 1150 may be a Graphic User Interface (GUI) and the like, such as a content viewer.

Also, the memory 1154 stores various pieces of information related to an operation of the mobile terminal 930. Particularly, the memory 1154 stores information used to use a service, such as the authentication code (an App ID and an App password), information on the electronic device 950, and the like.

The control unit 1152 not only controls the user interface 1150 and the memory 1154, but also controls an overall operation of the mobile terminal 930. Particularly, the control unit 1152 performs an operation of the mobile terminal according to an embodiment of the present invention, and as an example, extracts the authentication code from the memory 1154 as described in step 1100, and transmits the authentication code to the electronic device 950 in step 1102.

The electronic device 950 includes a control unit 1156, a memory 1158, a token management unit 1160, a token Database (DB) 1162, and the like. The control unit 1156 performs an overall operation of the electronic device 950, and controls the memory 1158, the token management unit 1160, and the token DB 1162.

The memory 1158 stores various pieces of information related to an operation of the electronic device 950. Particularly, the memory 1158 stores the authentication code, information used to log in to the NTS server 960, and the like.

The token management unit 1160 manages time periods for use of an access token and a refresh token, and performs an operation of acquiring and updating the access token and the refresh token. For example, in step 1104, the token management unit 1160 requests the authentication server 940 to provide an access code on the basis of an authentication code stored in the memory 1158. Then, in step 1106, the authentication server 940 transmits a refresh token and an access token to the electronic device 950.

Then, the refresh token and the access token are delivered to the token management unit 1160, and in step 1108, the token management unit 1160 updates the token DB 1162 by storing the received refresh token and access token in the token DB 1162.

Meanwhile, in FIG. 10, the token management unit 1160 and the control unit 1156 are illustrated as being distinguished from each other, and the token DB 1162 and the memory 1158 are illustrated as being distinguished from each other. However, the token management unit 1160 and the control unit 1156 may be integrated into one physical configuration unit, and the token DB 1162 and the memory 1158 may also be integrated into one physical configuration unit. Also, the electronic device 950 may be configured in various forms, such as a form in which an operation of the token management unit 1160 may be performed by the control unit 1156, a form in which the token DB 1162 may be included in the memory 1158, and the like.

Figure 12:
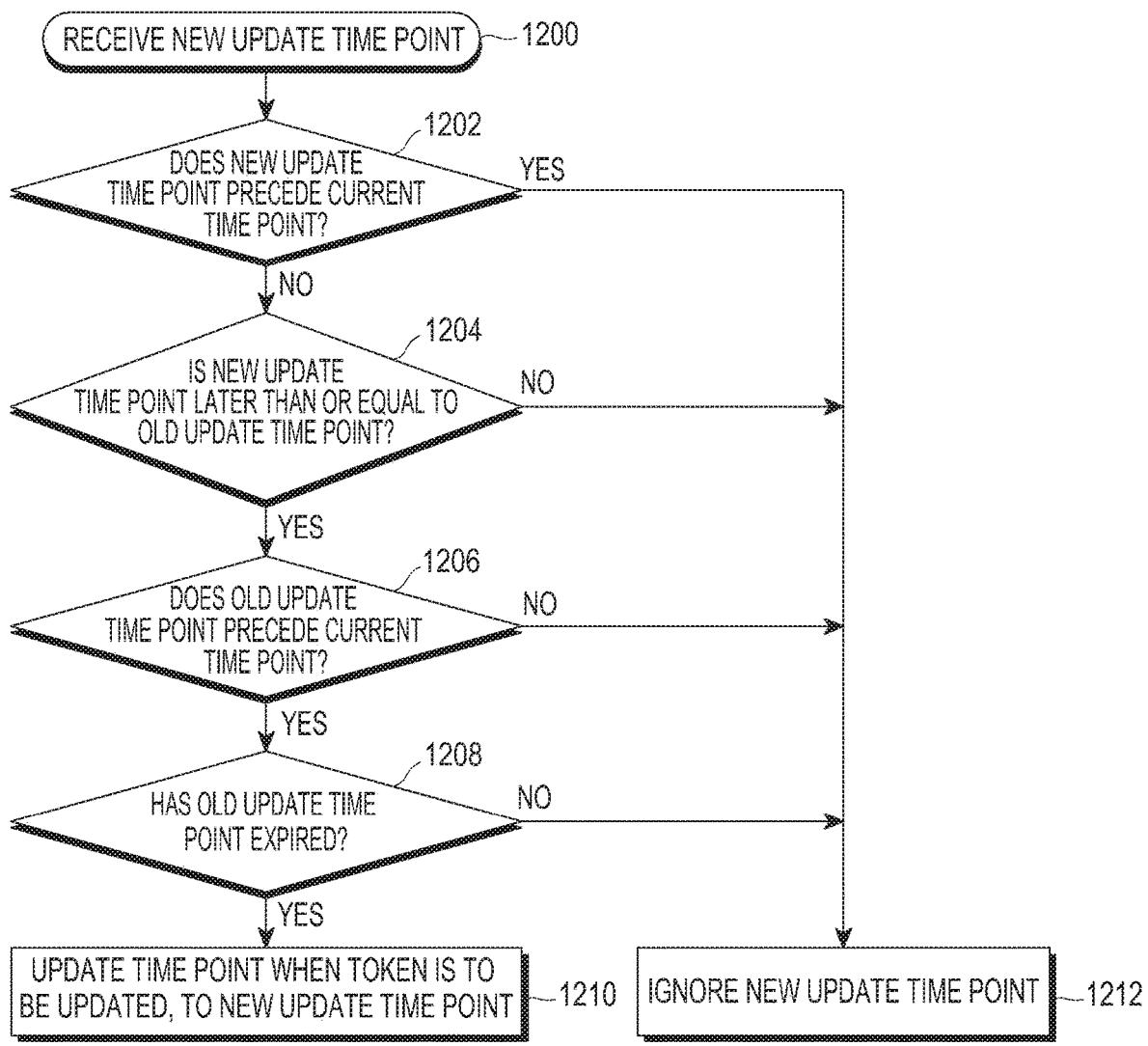
FIG. 12 is a flowchart illustrating a process for updating an access token by an electronic device according to an embodiment of the present invention.

FIG. 12 is a flowchart illustrating a process for updating an access token by an electronic device according to an embodiment of the present invention.

Referring to FIG. 12, as described in step 1200, the electronic device 950 may receive a new access token, and accordingly, information on a new update time point may be received by the token management unit 1160 of the electronic device 950. The new update time point represents a time point when a time period for use of the new access token expires.

The new update time point may be immediately transmitted to the token management unit 1160 and may be used. However, a case may occur in which a time period is required until the new update time point is delivered to the token management unit 1160. In this case, when the token management unit 1160 receives the new update time point, the token management unit 1160 performs the following operation of determining whether the new update time point is capable of being used.

In step 1202, the token management unit 1160 determines whether the new update time point precedes a current time point. When the new update time point precedes the current time point, in step 1212, the token management unit 1160 ignores the new update time point. In contrast, when the new update time point does not precede the current time point, the token management unit 1160 proceeds to step 1204, and determines whether the new update time point precedes an old update time point which is currently set.

When the new update time point does not precede the old update time point, in step 1212, the token management unit 1160 ignores the new update time point. In contrast, when the new update time point precedes the old update time point, in step 1206, the token management unit 1160 determines whether the old update time point precedes the current time point.

When the old update time point does not precede the current time point, the token management unit 1160 proceeds to step 1212, and ignores the new update time point. In contrast, when the old update time point precedes the current time point, in step 1208, the token management unit 1160 determines whether the old update time point has expired.

When the old update time point has not expired, the token management unit 1160 proceeds to step 1212, and ignores the new update time point. In contrast, when the old update time point has expired, in step 1210, the token management unit 1160 updates a time point when the token is to be updated, to the new update time point, and stores the updated time point in the token DB 1162.

Figure 13:
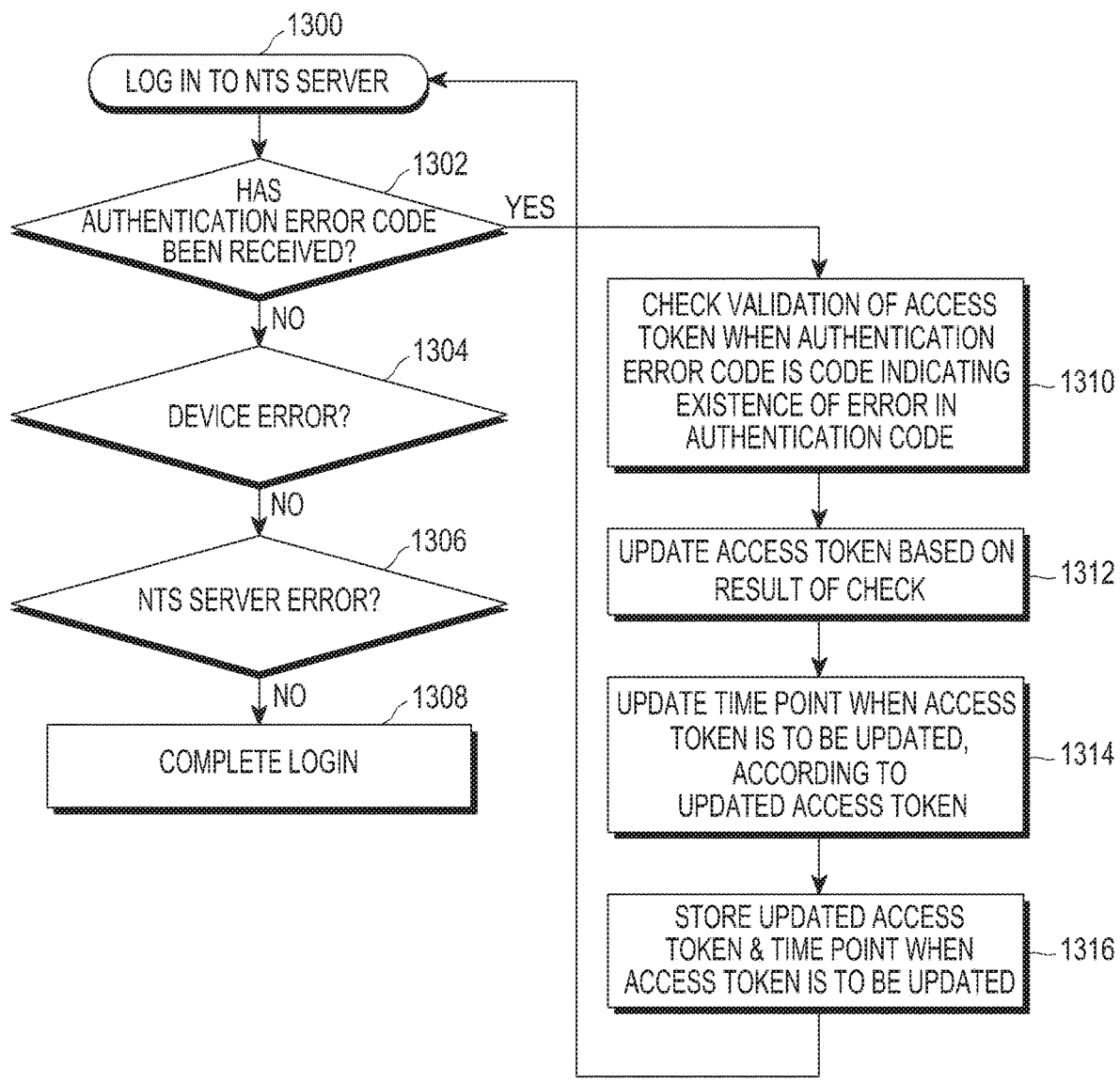
FIG. 13 is a flowchart illustrating a process for updating an access token based on a result of the login by an electronic device according to an embodiment of the present invention.

FIG. 13 is a flowchart illustrating a process for updating an access token based on a result of the login by an electronic device according to an embodiment of the present invention.

In step 1300, the electronic device 950 logs in to the NTS server 960. Specifically, the electronic device 950 transmits, to the NTS server 960, information (a group ID, a peer ID, a service port, a server domain, a server port, a timeout, an access token, etc.) required to log in to the NTS server 960.

Then, in step 1302, the electronic device 950 determines whether an authentication error code has been received from the NTS server 960. When the authentication error code has been received from the NTS server 960, the electronic device 950 proceeds to step 1310. When the authentication error code is a code indicating the existence of an error in an authentication code, the electronic device 950 checks the validation of an access token. Specifically, the electronic device 950 checks whether a time period for use of the access token has expired.

In step 1312, the electronic device 950 updates the access token on the basis of a result of the check. A method for updating the access token may be performed similarly to the method described with reference to FIG. 11. When the electronic device 950 receives an updated access token from the authentication server 940, in step 1314, the electronic device 950 updates a time point when the access token is to be updated, according to the updated access token. Then, in step 1316, the electronic device 950 stores the updated access token and information on the updated time point.

Meanwhile, when the authentication error code has not been received in the step 1302, in step 1304, the electronic device 950 determines whether a device error related to the electronic device 950 has occurred. When the device error has not occurred, in step 1306, the electronic device 950 determines whether an error related to the NTS server 960 has occurred. When the error related to the NTS server 960 has not occurred, in step 1308, the electronic device 950 completes the login.

Figure 14A:
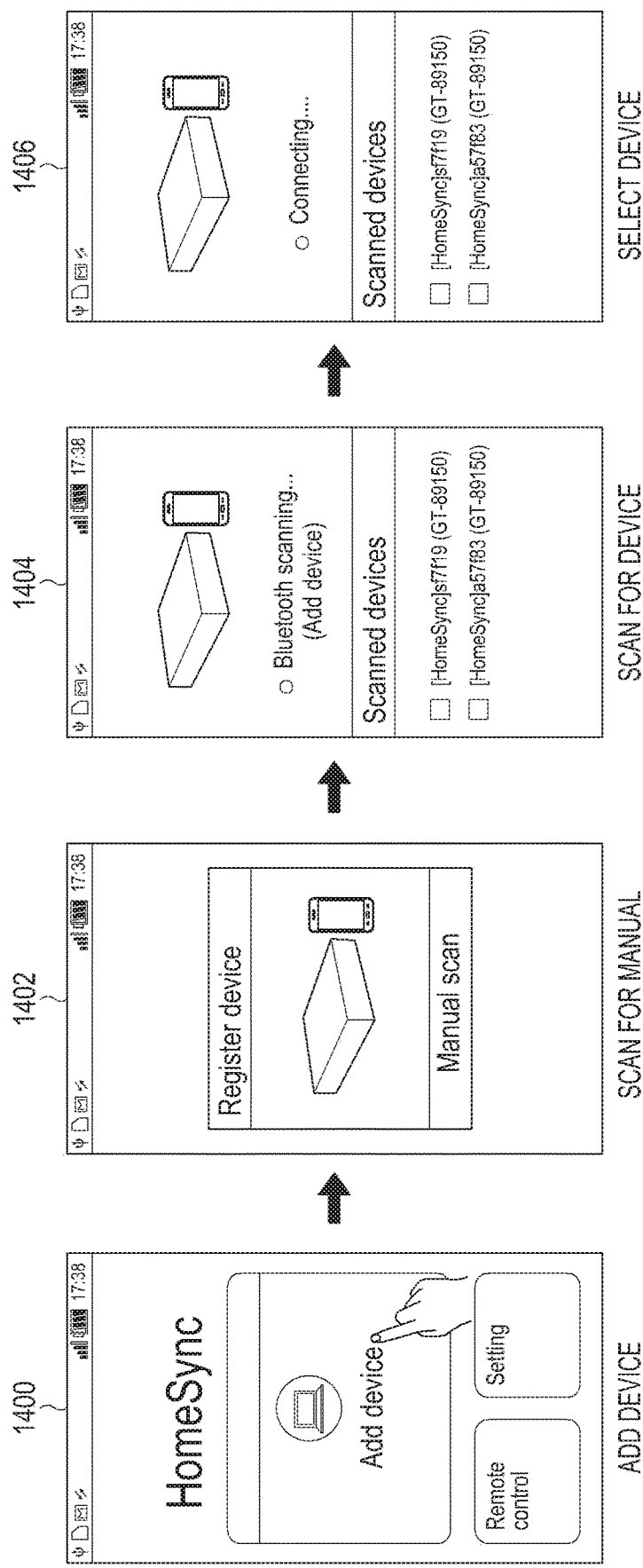
FIGS. 14A and 14B are views illustrating examples of a screen of a user interface of a mobile terminal according to an embodiment of the present invention.
Figure 14B:
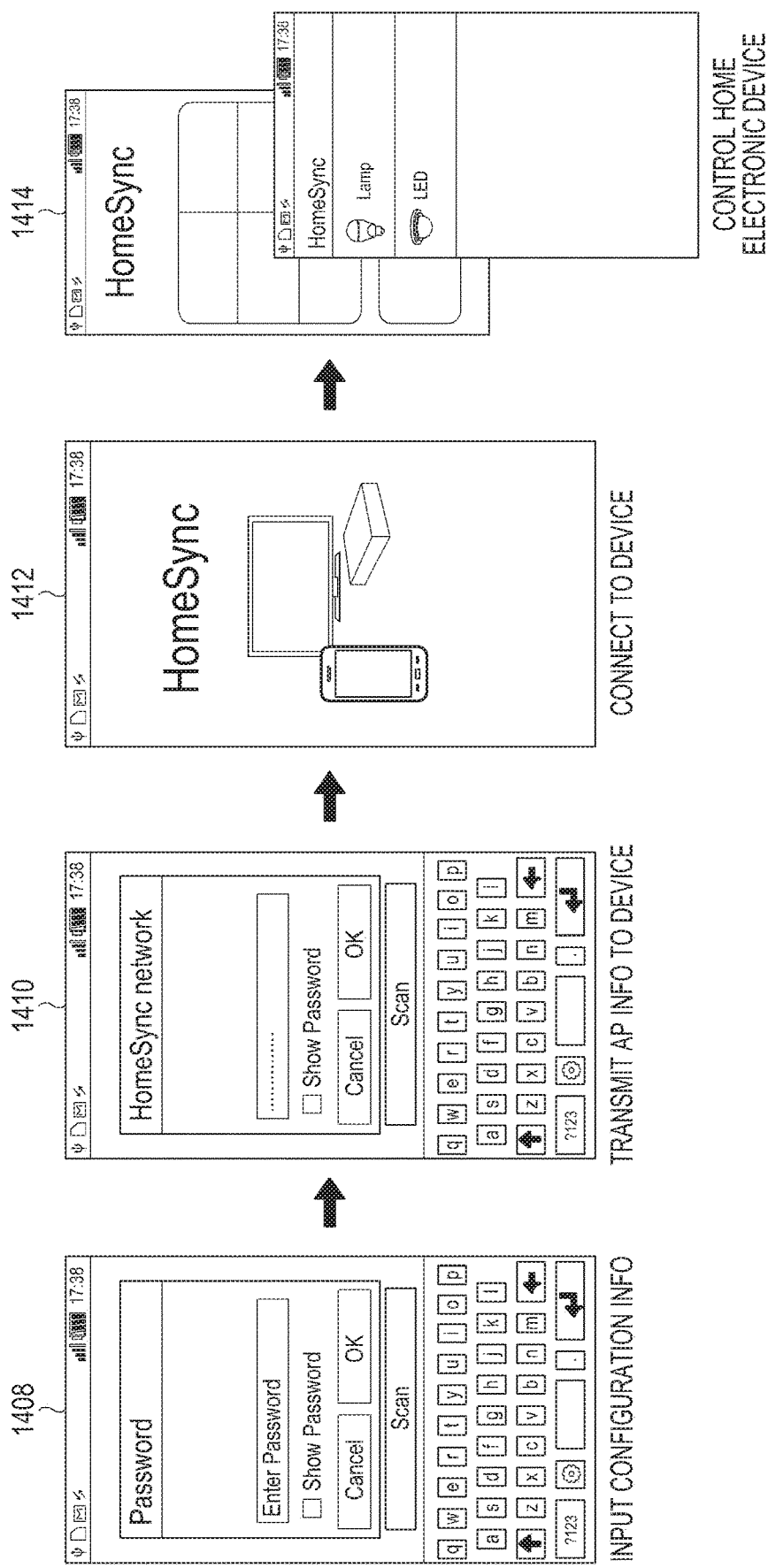

FIGS. 14A and 14B are views illustrating examples of a screen of a user interface of a mobile terminal according to an embodiment of the present invention.

FIGS. 14A and 14B illustrate examples of the screen displayed on the user interface 1150 when the mobile terminal 930 uses an App used to control a home electronic device.

Referring to FIG. 14A, in step 1400, the mobile terminal 930 displays a menu which enables a user to add a home electronic device. When the user selects the menu for adding a home electronic device, in step 1402, the mobile terminal 930 displays a menu which enables the user to select whether to scan for a manual regarding how to communicate with the home electronic device.

When the user selects scanning for the menu, in step 1404, the mobile terminal 930 performs a device scanning operation, and displays, on the screen, a result of performing the device scanning operation. Then, when the user selects one of the scanned devices in step 1406, the mobile terminal 930 starts a preparation operation of connecting to the selected device.

In step 1408 in FIG. 14B which follows step 1406 in FIG. 14A, the mobile terminal 930 displays a menu which enables the user to input configuration information (a password of an AP, etc.). The user inputs the configuration information, and in step 1410, the mobile terminal 930 displays a menu, which enables the transmission of information on the AP to the relevant device, when the input configuration information coincides with pre-stored configuration information.

Next, after the mobile terminal 930 transmits the information on the AP to the relevant device according to the selection of the user, in step 1412, the mobile terminal 930 performs a connection to the relevant device through Wi-Fi communication, and displays a result of performing the connection. Then, in step 1414, the mobile terminal 930 is connected to the relevant device and displays a menu which enables the user to use a service capable of controlling the home electronic device.

Although the embodiment has been described in the detailed description of the present invention, the present invention may be modified in various forms without departing from the scope of the present invention. Therefore, the scope of the present invention should not be defined as being limited to the embodiments, but should be defined by the appended claims and equivalents thereof.

The invention claimed is:

1. A method for transmitting, by a first device, authentication information to a second device in a wireless communication system, the method comprising:
obtaining, by the first device, from an authentication server, an authentication code based on an identifier (ID) of an application associated with a service and a password of the application;
establishing a Wi-Fi peer to peer (P2P) connection between the first device and the second device;
obtaining, by the first device, from the second device, second device information about the second device based of the Wi-Fi P2P connection;
transmitting, by the first device, to a device-information management server, a request for registering the second device in the device-information management server based on the second-device information;
in response to the second device being registered in the device-information management server, obtaining, by the first device, from the device-information management server, registration information including information on a service-providing server and a peer identifier (ID) to be used by the second device to access the service-providing server; and
transmitting by the first device, to the second device, the authentication code and the registration information including the information on the service-providing server and peer ID,
wherein the authentication code is transmitted from the second device to the authentication server such that access information for accessing the service-providing server is obtained by the second device, and
wherein the information on the service-providing server includes an internet protocol (IP) address for accessing the service-providing server, or port information for accessing the service-providing server.

2. The method of claim 1, wherein obtaining the authentication code comprises:
transmitting, to the authentication server, an authentication request message including the ID of the application and the password of the application; and
receiving, from the authentication server, an authentication response message including the authentication code in response to the authentication request message.

3. The method of claim 1, wherein the peer ID is transmitted from the device-information management server to the service-providing server.

4. A method for receiving authentication information from a first device in a second device of a wireless communication system, the method comprising:
establishing a Wi-Fi peer to peer (P2P) connection between the first device and the second device;
transmitting, by the second device, to the first device, second-device information about the second device based of the Wi-Fi P2P connection;
in response to registering in a device-information management server based on the second-device information, receiving, by the second device, from the first device, an authentication code and registration information of the second device, wherein the registration information includes information on a service-providing server and a peer identifier (ID) to be used by the second device to access the service-providing server; and the authentication code is obtained by the first device from an authentication server based on an ID of an application associated with a service and a password of the application;
obtaining, by the second device, from the authentication server, access information for accessing the service-providing server based on the authentication code; and
transmitting, by the second device, to the service-providing server, a service request message for requesting the service based on the access information and the registration information including the information on the service-providing server and the peer ID,
wherein the information on the service-providing server includes an internet protocol (IP) address for accessing the service-providing server, or port information for accessing the service-providing server.

5. The method of claim 4, wherein obtaining the access information comprises:
transmitting, to the authentication server, an access information request message including the authentication code; and
receiving, from the authentication server, an access information response message including the access information in response to the access information request message.

6. The method of claim 4, wherein the peer ID is transmitted from the device-information managemnt server to the service-providing server.

7. A first device for transmitting authentication information to a second device in a wireless communication system, the first device comprising:
communication circuitry; and
at least one processor configured to:
obtain, from an authentication server, an authentication code based on an identifier (ID) of an application associated with a service and a password of the application,
establish a Wi-Fi peer to peer (P2P) connection between the first device and the second device;
obtain, from the second device, second device information about the second device based of the Wi-Fi P2P connection;
control the communication circuitry to transmit, to a device-information management server, a request for registering the second device in the device-information management server based on the second-device information,
in response to the second device being registered in the device-information management server, obtain, from the device-information management server, registration information including information on a service-providing server and a peer identifier (ID) to be used by the second device to access the service-providing server, and
control the communication circuitry to transmit, to the second device, the authentication code and the registration information including the information on the service-providing server and the peer ID,
wherein the authentication code is transmitted from the second device to the authentication sever such that access information for accessing the service-providing server is obtained by the second device, and
wherein the information on the service-providing server includes an internet protocol (IP) address for accessing the service-providing server, or port information for accessing the service-providing server.

8. The first device as claimed in claim 7,
wherein the at least one processor is further configured to, to obtain the authentication code:
control the communication circuitry to transmit, to the authentication server, an authentication request message including the ID and the password of the application, and
receive, via the communication circuitry, from the authentication server, an authentication response message including the authentication code in response to the authentication request message.

9. The first device of claim 7, wherein the peer ID is transmitted from the device-information management server to the service-providing server.

10. A second device for receiving authentication information from a first device in a wireless communication system, the second device comprising:
communication circuitry; and
at least one processor configured to:
establish a Wi-Fi peer to peer (P2P) connection between the first device and the second device;
control the communication circuitry to transmit, to the first device, second-device information about the second device based on the Wi-Fi P2P connection,
in response to registering in a device-information management server based on the second-device information, receive, via the communication circuitry, from the first device, an authentication code and registration information of the second device, wherein the registration information includes information on a service-providing server and a peer identifier (ID) to be used by the second device to access the service-providing server, and the authentication code is obtained by the first device from an authentication server based on an ID of an application associated with a service and a password of the application,
obtain, from the authentication server, access information for accessing the service-providing server based on the registration information and the authentication code, and
control the communication circuitry to transmit, to the service-providing server, a service request message for requesting the service based on access information and the registration information including the information on the service-providing server and the peer ID,
wherein the information on the service-providing server includes an internet protocol (IP) address for accessing the service-providing server, or port information for accessing the service-providing server.

11. The second device of claim 10, wherein the at least one processor is further configured to:
Control the communication circuitry to transmit, to the authentication server, an access information request message including the authentication code, and
Receive, via the communication circuitry, from the authentication server, an access information response message including the access information in response to the access information request message.

12. The second device of claim 10, wherein the peer ID is transmitted from the device-information management server to the service-providing server.

* * * * *